United States Patent [19]
Arimoto

[11] Patent Number: 5,696,417
[45] Date of Patent: Dec. 9, 1997

[54] ELECTROMAGNETIC INDUCTION DRIVING METHOD AND DEVICE

[76] Inventor: Satomi Arimoto, 40-2, Kitaooi, Uchitacho, Naga-gun, Wakayama, Japan

[21] Appl. No.: 497,469

[22] Filed: Jun. 30, 1995

[30] Foreign Application Priority Data

Jul. 1, 1994 [JP] Japan .............. HEI6-150760

[51] Int. Cl.⁶ .................. H02K 16/00; H02K 41/00
[52] U.S. Cl. ........................... 310/114; 310/12
[58] Field of Search ...................... 310/114, 112, 310/157, 254, 12, 179, 185

[56] References Cited

U.S. PATENT DOCUMENTS

| | | | |
|---|---|---|---|
| 4,009,406 | 2/1977 | Inariba | 310/164 |
| 4,305,024 | 12/1981 | Kuroki | 318/254 |
| 4,409,491 | 10/1983 | Schott | 307/77 |
| 4,899,072 | 2/1990 | Ohta | 310/49 R |
| 5,203,430 | 4/1993 | Grinaski et al. | 310/12 |
| 5,283,492 | 2/1994 | Mason | 310/114 |
| 5,365,134 | 11/1994 | Mason et al. | 310/114 |
| 5,387,818 | 2/1995 | Leibowitz | 290/1 R |
| 5,455,473 | 10/1995 | Lipo et al. | 310/114 |

FOREIGN PATENT DOCUMENTS

| | | |
|---|---|---|
| 027724 | 4/1981 | European Pat. Off. . |
| 195585 | 9/1986 | European Pat. Off. . |
| 599331 | 6/1994 | European Pat. Off. . |
| 2555376 | 3/1985 | France . |
| 18 28 456 | 3/1961 | Germany . |
| 285723 | 11/1970 | Germany . |
| 56-141767 | 11/1981 | Japan . |
| 60-176452 | 9/1985 | Japan . |

Primary Examiner—Steven L. Stephan
Assistant Examiner—Michael J. Wallace, Jr.
Attorney, Agent, or Firm—Armstrong, Westerman, Westerman, Hattori, McLeland & Naughton

[57] ABSTRACT

A drive member of the device is made of electrically conductive non-magnetic material, supported rotatably or movably straight and uniform in wall thickness and width. An outer magnetic member and an inner magnetic member are arranged respectively at the outer side and the inner side of the drive member which are orthogonal to the direction of movement thereof. At least one of the outer and inner magnetic member has at least three magnetic poles to provide closed magnetic circuits extending from the respective poles and penetrating the drive member and the magnetic members along a round path. The poles have a width less than that of the drive member and are arranged centrally around the drive member, so that the drive member has edge portions which are not opposed to the poles, at opposite sides thereof which are orthogonal to the direction of movement. When fluxes with at least three different phases are produced at the respective poles of the magnetic circuits, each flux generates an induced current in the drive member, whereby an electromagnetic force acting on the drive member is produced between the flux and the current to move the drive member relative to one or both of the outer and inner magnetic members.

19 Claims, 17 Drawing Sheets

ELECTROMAGNETIC INDUCTION DRIVING METHOD AND DEVICE

BACKGROUND OF THE INVENTION

1. Field of the Invention

The present invention relates to an electromagnetic induction driving method and devices wherein a driving force is produced by electromagnetic induction using an a.c. power source.

2. Description of the Related Art

Three-phase induction motors and single-phase induction motors can are examples of electromagnetic induction driving devices. Such motors comprise a fixed external stator provided with coils which are equal in number to the number of phases multiplied by the number of poles, and a cage rotor. Alternating currents displaced in phase from one another are applied to the field coils to set up a rotating magnetic field or a shifting magnetic field. In the case of single-phase induction motors, a capacitor is connected to the coils to displace the phase of a.c. currents. An induced current is generated in the cage rotor due to a difference in relative moving speed between the rotating magnetic field and the rotor, and an electromagnetic force in a direction determined by Fleming's left-hand rule is produced between the induced current and the rotating magnetic field to drivingly rotate the rotor.

It is known that these induction motors have the following drawbacks.

The field coils which have a specified number of turns and which are equal in number to the number of phases multiplied by the number of poles are arranged in grooves formed in the inner surface of iron core of the stator, so that provision of the coils requires much labor. Furthermore, many kinds of motors need to be prepared in stock which correspond to the number of combinations of desired speeds of rotation and differences in the power source frequency or power source voltage which differs from district to district.

The rotational driving force includes a vibration component twice the power source frequency, such that when driven at a low speed, the motor gives off a noise.

The rotation of the rotor is transmitted to another device by means of belts, pulleys, gears or the like. This entails an impaired transmission efficiency, power losses and generation of noise.

Further with three-phase induction motors, the direction in which the rotating magnetic field is produced can be reversed by replacing two of the three phases of the power source by each other, so that the drive shaft is reversely rotatable easily, whereas the rotation of the drive shaft of the single-phase induction motor can not be reversed. Accordingly, when the torque produced by the motor is to be reversed, a power transmission or the like must be used to reverse the rotation of the drive shaft. This renders the device large-sized and complex.

SUMMARY OF THE INVENTION

The present invention provides an electromagnetic induction driving device wherein the drive member is rotatable or movable straight on a principle different from the principle of conventional three-phase or single-phase induction motors.

The device of the invention comprises a drive member 4 made of electrically conductive non-magnetic material and supported rotatably or movably straight, and an outer magnetic member 2 and an inner magnetic member 3 arranged respectively at an outer side and an inner side of the drive member which are orthogonal to the direction of movement thereof.

Closed magnetic circuits are formed for magnetic flux to pass therethrough to penetrate the drive member 4 at at least three locations between the outer and inner magnetic members 2, 3. The drive member 4 is provided, at its opposite sides orthogonal to the direction of movement, with edge portions 41, 41 not opposed to magnetic poles 22, 23, i.e., not penetrated by the flux. The magnetic fluxes passing through the respective magnetic circuits are different in phase. The phase difference of the fluxes moves the drive member 4 relative to one or both of the outer and inner magnetic members 2, 3.

The device of the present invention has the closed magnetic circuit for the flux originating from the outer magnetic member 2 to pass through the drive member 4 and then through the inner magnetic member 3, then penetrate the drive member 4 again and return to the outer magnetic member 2, whereas the conventional induction motor comprising a stator and a rotor differs from the invention in that no closed magnetic circuit extends through the conductive portion of the cage rotor.

According to the present invention, the drive member 4 is disposed in gaps of the closed magnetic circuits defined by the outer magnetic member 2 and the inner magnetic member 3 opposed thereto, and at least three fluxes penetrating the drive member 4 are different from one another in phase. As shown in FIG. 2d, the fluxes penetrating the drive member induce respective currents in the plane of the drive member 4. For example, the flux $\Phi 2$ generates an induced current which flows in one edge portion 41 along the direction of movement of the drive member 4 and then across the adjacent magnetic circuit $\Phi 3$ penetrating the drive member 4, flows in the other edge portion 41 toward the opposite direction and then flows across the other magnetic circuit $\Phi 1$ penetrating the drive member 4, the current thus flowing along a round path to produce an electromagnetic force on the drive member 4 between the flux $\Phi 2$ and the induced current I32, whereby the drive member 4 is rotated or moved straight.

An object of the present invention is to provide a device and a method wherein an inner magnetic member 3 and a drive member 4 are formed each in the shape of a cylinder and joined together, and magnetic poles 22 are formed on an outer magnetic member 2 to rotate the inner magnetic member 3 and the drive member 4 (FIGS. 5a and 5b).

Another object of the invention is to provide a device and a method wherein an outer magnetic member 2 and a drive member 4 are formed each in the shape of a cylinder and joined together, and magnetic poles 32 are formed on an inner magnetic member 3, the outer magnetic member 2 and the drive member 4 being rotatable (FIGS. 7a and 7b).

Another object of the invention is to provide a device and a method wherein a drive member 4 is formed in the shape of a cylinder, and magnetic poles are formed on outer and inner magnetic members 2, 3 and opposed respectively to the outer side and inner side of the drive member 4, the drive member 4 being drivingly rotatable (FIGS. 11a, 11b and 14).

Another object of the invention is to provide a device wherein at least one of outer and inner magnetic members 2, 3 is provided with at least three magnetic poles 22, at least one of the poles being provided with a coil 51 for use in common for forward and reverse driving, the other poles being provided with a forward driving coil 61 and a reverse driving coil 71 respectively, the forward and reverse driving coil 51 being electrically connected in series with a power source 52 to constitute a closed electric circuit 5, the forward driving coil 61 and the reverse driving coil 71 being alternatively connectable in series with an electric element 63 comprising a capacitor, resistor or the combination thereof to constitute closed electric circuits 6, 7, whereby a forward or reverse phase difference is produced between magnetic fluxes penetrating a drive member 4, the invention further providing a method of producing the phase difference (FIGS. 1a and 1b).

Another object of the invention is to provide a device wherein at least one of outer and inner magnetic members 2, 3 is provided with at least three magnetic poles 22 or 32, at least one of the poles being provided with a coil 51 connected in series with an a.c. power source 52 to constitute a closed electric circuit 5, at least one of the poles being provided with a coil 61 electrically connected in series with an electric element 63 comprising a capacitor, resistor or the combination thereof to constitute a closed electric circuit 6, whereby a phase difference is produced between magnetic fluxes penetrating a drive member 4, the invention further providing a method of producing the phase difference (FIGS. 9a, 9b, 11a, 11b).

Another object of the invention is to provide a device wherein at least one of outer and inner magnetic members 2,3 has three magnetic poles 22 or 32, each of the poles being provided with a coil 51, the coils being connected to three-phase a.c. power sources 53, 54, 55, whereby a phase difference is produced between magnetic fluxes penetrating a drive member 4, the invention further providing a method of producing the phase difference.

BRIEF DESCRIPTION OF THE DRAWINGS

FIG. 7b is a view in section taken along a plane orthogonal to the rotary shaft of the device of FIG. 7a;

DESCRIPTION OF THE PREFERRED EMBODIMENTS

The electromagnetic induction driving device of the present invention has a first basic structure or a second basic structure depending on whether a phase difference between magnetic fluxes penetrating through a drive member 4 is produced only in the forward direction or in both forward and reverse directions. Each of these structures and embodiments having the structure will be described in detail with reference to the drawings.

First Basic Structure

Figure 1A:
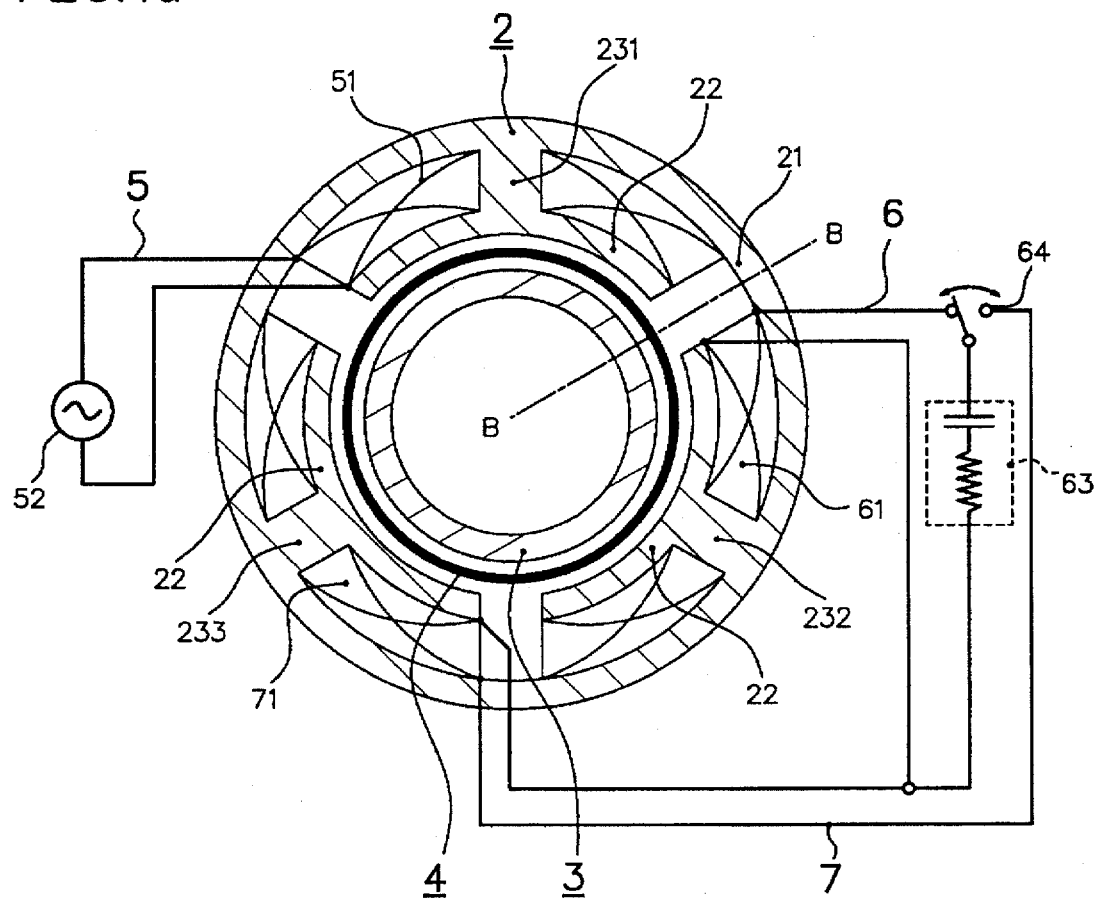
FIG. 1a is a diagram of an electromagnetic induction driving device embodying the invention to show a basic structure 1.

FIG. 1a shows the first basic structure of the present invention. This structure is modified into various embodiments as will be described below. An outer magnetic member 2 has three iron cores 231, 232, 233 projecting from a yoke 21 and each having an enlarged inner end to provide a magnetic pole 22 having a circular-arc inner face.

First and second iron cores 231, 232 are provided with field coils 51, 61, respectively, and the third iron core 233 has a field coil 71.

The coil 51 on the first core 231 is connected to an a.c. power source 52, for example, of 60 Hz by a closed electric circuit 5 and is energized.

An inner magnetic member 3 is in the form of a cylinder concentric with the arcs of the inner faces of the magnetic poles 22. A drive member 4 made of electrically conductive nonmagnetic material is disposed in a gap between the inner magnetic member 3 and the poles 22 and is freely rotatable.

The drive member 4 is in the form of a cylinder having a uniform wall thickness and has a width, i.e., a length orthogonal to the direction of rotation, which is larger than the width of the poles 22. The magnetic poles 22 are arranged as opposed approximately to the midportion of width of the drive member 4. Accordingly, the drive member 4 has at its opposite ends edge portions 41, 41 not facing the magnetic pole 22.

The coils 61, 71 on the second and third cores 232, 233 are connected together each at its one end. One of the other ends of these coils is electrically connected in series with an electric element 63 comprising a capacitor, resistor or the combination thereof by the action of a switch 64 to form a closed circuit, with the remaining end left unconnected. In the case where the coil 61 is connected to the electric element 63 by the switch 64, the magnetic flux of a magnetic circuit having the coil 61 and extending through the second core 232 and then through the drive member 4 passes through the inner magnetic member 3, penetrates the drive member again and returns to the outer magnetic member 2 via the first core 231 and the third core 233 having the respective coils 51, 71, thus forming respective magnetic circuits. Therefore, magnetic fluxes in the forward direction which are different in phase are produced at the respective poles 22.

When the coil 71 is connected to the electric element 63 by operation of the switch 64, the magnetic circuit having the coil 71 which has a different position than the coil 61 produces at the poles 22 fluxes in the reverse direction which are different in phase.

Figure 1B:
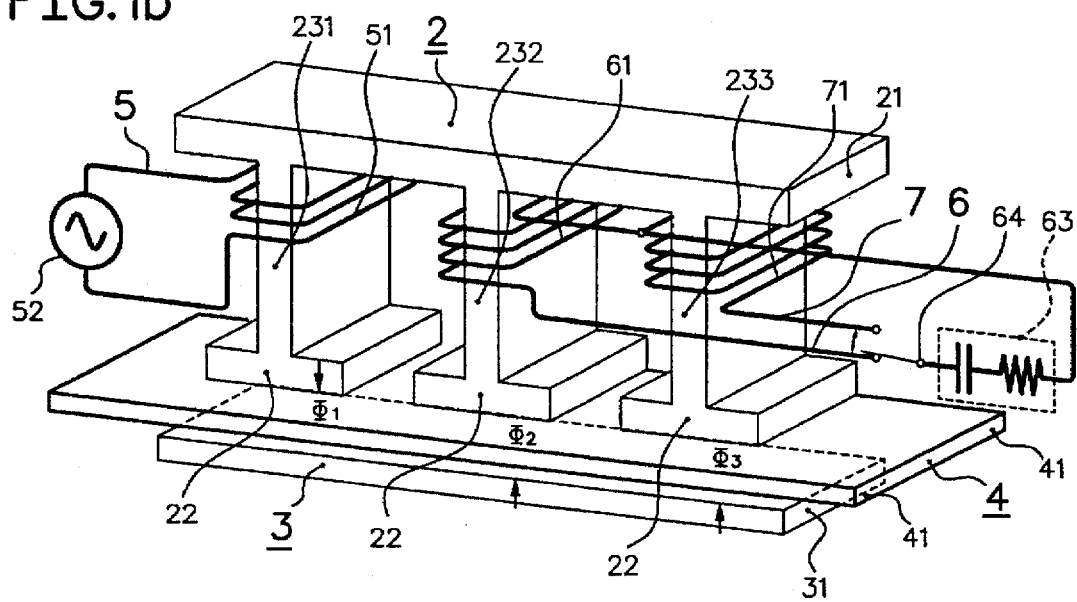
FIG. 1b is a perspective view of the device as cut along the line B—B in FIG. 1a and developed along a plane.

For the ease of description, FIG. 1b shows the structure of FIG. 1a as cut along the line B—B in FIG. 1a and developed into an arrangement on a plane. In FIGS. 1a and 1b, like parts are referred to by like numerals.

Drive Principle

The drive member 4 operates on the principle to be described below.

Figure 2A:
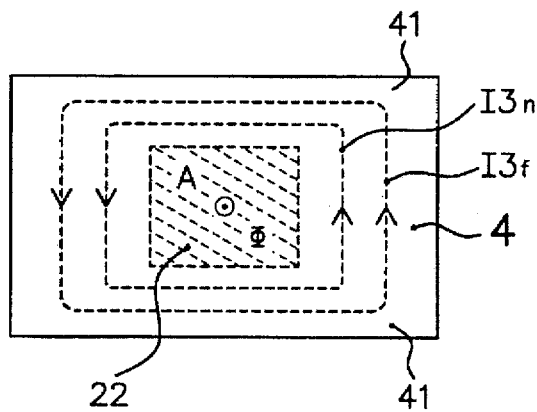
FIGS. 2a to 2d are diagrams illustrating the principle on which induced currents and electromagnetic forces are produced by the arrangement of a drive member 4 and magnetic poles 22.

FIG. 2a shows one magnetic pole 22 as opposed to the drive member 4 of electrically conductive nonmagnetic material. When an alternating current is passed through the coil on the core of the pole, magnetic flux Φ flowing through a closed magnetic circuit including the outer and inner magnetic members 2, 3 concentrates on the pole 22 and penetrates the drive member 4. An induction current I3 in proportion to the variation in the magnetic flux Φ with time flows around the magnetic pole 22 in the plane of the drive member 4.

The reason why the induction current I3 occurs can be explained as follows. When the magnetic flux Φ through a coil which is n in the number of turns varies with time, an induction electromotive force E expressed by Eq. 1 below is generated at opposite ends of the coil as is known.

$$E = n \cdot \frac{\delta \Phi}{\delta t} \qquad \text{Eq. 1}$$

In the plane of the drive member 4 shown in FIG. 2a, the region outside the region A thereof opposed to the magnetic pole 22 can be regarded as a coil which is 1 in the number of turns, and a current flows according to Kirchhoff's second law. More specifically, suppose the equivalent resistance of the region outside the region A is r3. A change in the flux then produces an induced current I3.

$$I3 = -n \cdot \frac{\delta \Phi}{\delta t} \qquad \text{Eq. 2}$$

The direction of flow of the induced current I3 and the magnitude thereof alter from moment to moment in accordance with the direction of the flux and the variation in the magnitude of the flux with time. For example, in the case where the flux flows upward with respect to the plane of FIG. 2a and changes in a direction toward an increase in the flux, the induced current flows in the direction of advance of a right-hand screw according to Faraday's law.

Figure 2B:
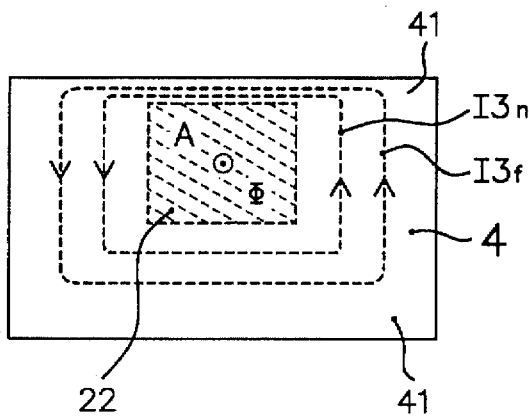

The magnitude of the induced current I3 is inversely proportional to the equivalent resistance r3 of the path of flow of the current through the plane of the drive member 4, so that in FIGS. 2a and 2b, the current I3n near the pole 22 is great while the current I3f far from the pole 22 is small (I3n>I3f).

Figure 2C:
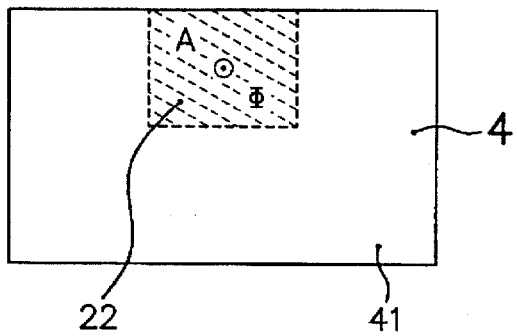

Further when the pole 22 is disposed with the edge of the drive member 4 as shown in FIG. 2c, the induced current is unable to flow around the pole 22, resulting in no induced current. The induced current occurs when the drive member 4 is wider than the pole 22 and has its edge portions 41, 41, which are not opposed to the pole 22, positioned at opposite sides of the pole 22.

Figure 2D:
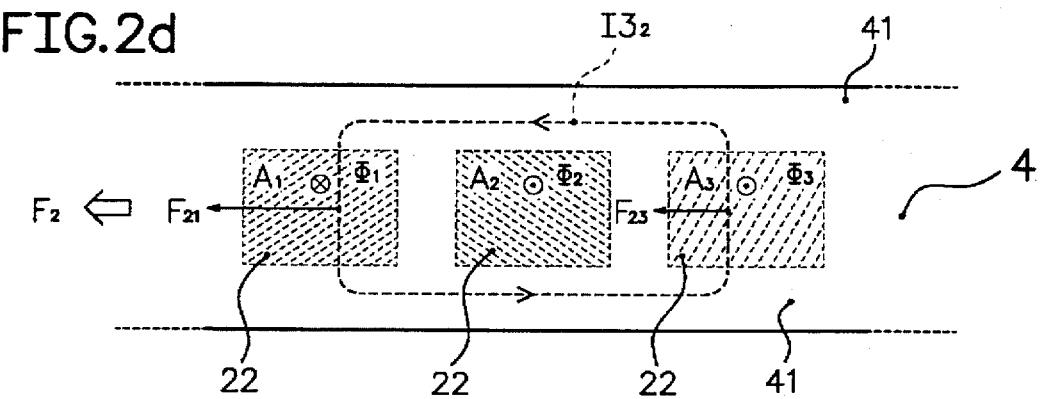

With reference to FIG. 2d, it is assumed that the magnetic poles 22 of the first to third iron cores 231, 232, 233 respectively occupy regions A1, A2, A3 above the drive member 4. Suppose only the coil 22 on the second core 232 is energized. On the drive member 4 is then produced an induced current I32 flowing around the region A2 across the region A1 or A3. Within the region A2 immediately below the pole 22, the currents induced by adjacent fluxes offset each other, with the result that no induced current appears in this region.

FIG. 2d is a simplified diagram showing only the drive member 4 and three magnetic poles 22 of FIG. 1b. A flow of alternating current through the two coils 51, 61 causes fluxes Φ1, Φ2, changing with time, to penetrate the regions A1, A2.

The first core 231 is connected to a closed magnetic circuit through the inner magnetic member 3, and the second and third cores 232, 233 and yoke 21 of the outer magnetic member 2. Accordingly, the flux Φ1 produced by the coil 51 on the first core 231 passes to the inner magnetic member 3 through the pole 22 and then through the drive member 4 at the region A1, and penetrates the drive member 4 as divided in two for the regions A2, A3. The fluxes then pass through the cores 232, 233, join at the yoke 21, and return to the some second core 232.

Similarly, the flux Φ2 produced by the coil 61 on the second core 232 passes to the inner magnetic member 3 through the pole 22 and then through the drive member 4 at the region A2, and penetrates the drive member 4 as divided in two for the regions A1, A3. The fluxes then pass through the cores 231, 233, join at the yoke 21 and return to the same second core 232.

The third core 233 of the pole 22 opposed to the region A3 has the coil 71, which, however, is unenergized and therefore produces no flux. Nevertheless, the fluxes Φ1, Φ2 produced by the coils 51, 61 on the first and second cores 231, 232 return from the inner magnetic member 3 to the outer magnetic member 2, so that divided portions of these fluxes passing through the third core 233 combine together as flux Φ3, which penetrates the drive member 4 at the region A3 through the pole 22.

When the alternating current source is connected to the coil 51 on the first core 231 and the electric and magnetic circuits are suitably so conditioned that the fluxes Φ1, Φ2 are made different in phase by 120° and made to have the same magnitude by the electric element 63 incorporated in the closed electric circuit 6, the fluxes Φ1, Φ2 available are expressed as follows.

$$\Phi 1 = \Phi 0 \cdot \sin(\omega \cdot t)$$

$$\Phi 2 = \Phi 0 \cdot \sin(\omega \cdot t - 120°) \qquad \text{Eq. 3}$$

where ω=2 πf, and f=power source frequency.

The magnetic flux Φ3 through the third core 233 can be expressed as follows when the conditions for the magnetic circuit are determined suitably.

$$\Phi 3 = \Phi 0 \cdot \sin(\omega \cdot t - 240°)$$ Eq. 4

Assuming that the equivalent resistance around each of the regions A1, A2, A3 of the drive member 4 is r30, the induced currents I31, I32, I33 produced by the fluxes Φ1, Φ2, Φ3 are as follows.

$$\begin{aligned} I31 &= -\omega \cdot \Phi 0 \cdot \cos(\omega \cdot t)/r3_0 \\ I32 &= -\omega \cdot \Phi 0 \cdot \cos(\omega \cdot t - 120°)/r30 \\ I33 &= -\omega \cdot \Phi 0 \cdot \cos(\omega \cdot t - 240°)/r30 \end{aligned}$$ Eq. 5

Figure 3A:
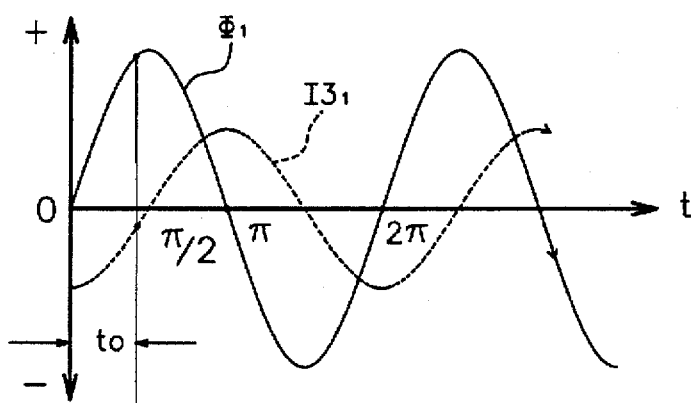
FIGS. 3a to 3c are graphs showing variations with time of fluxes at the poles of first, second and third iron cores 231, 232, 233 and variations with time of induced currents.
Figure 3B:
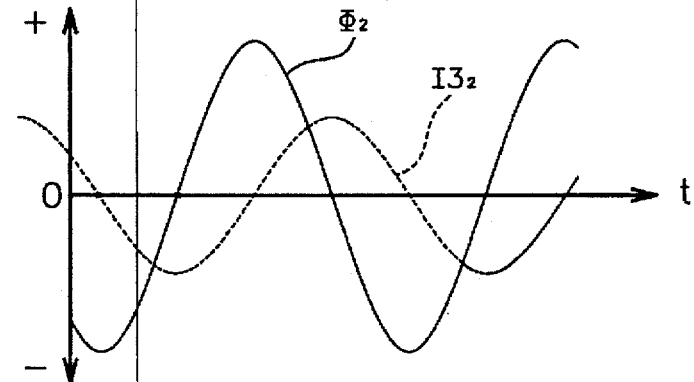
Figure 3C:
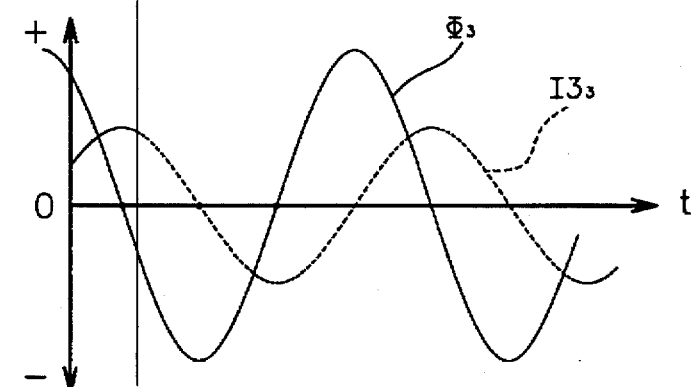

As shown in FIGS. 3a to 3c, the induced current I3 has a waveform delayed by 90° in phase relative to the flux Φ. At optional time t0, there is the relationship of Φ1+Φ2+Φ3=0.

With reference to FIG. 2d, the flux Φ2 through the second core 232 induces in the drive member 4 the current I32 flowing around the region A2 and passing the regions A1, A3.

Since the three poles 22 are actually arranged close to one another and are sized so as to generally cover the length of the drive member 4, the current flowing through the clearances between the regions is small and almost negligible.

The flux Φ1 acts on the current I32 across the region A1 and applies an electromagnetic force F21 in a direction determined by Fleming's left-hand rule. Similarly, the flux Φ3 acts on the current I32 in the region A3 and applies an electromagnetic force F23. The two electromagnetic forces combine into a force F2 to rotate the drive member 4 or move the member 4 straight.

Figure 4A:
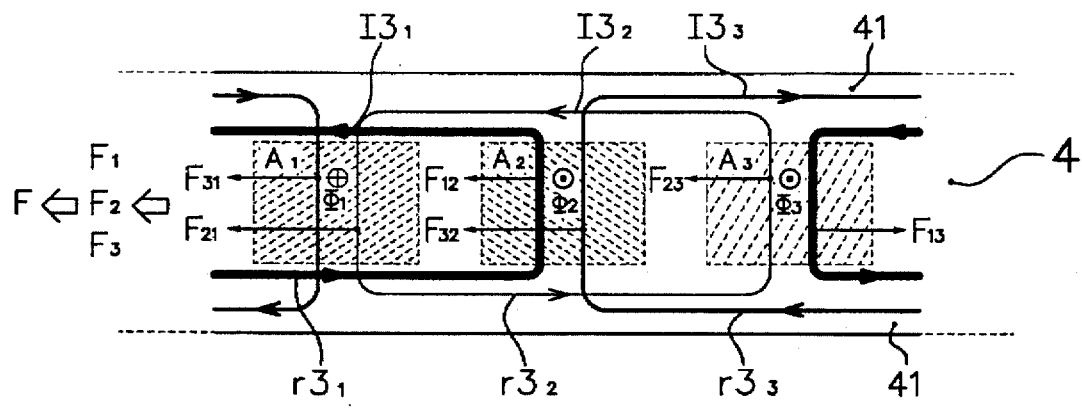
FIG. 4a is a diagram illustrating the drive principle of the basic structure 1.

The drive member 4 is in actuality a cylinder as shown in FIG. 1a, so that with reference to FIG. 4a, the flux Φ1 penetrating the region A1 induces the current I31 across the fluxes of the regions A2, A3. Similarly, the flux Φ3 penetrating the region A3 induces the current I33 across the fluxes of the regions A1, A2.

Since the currents I31, I32, I33 induced in the plane of the drive member 4 by the fluxes Φ1, Φ2, Φ3 penetrating the respective regions A1, A2, A3 can be superposed, the electromagnetic forces F1, F2, F3 acting on the member 4 can also be superposed.

As previously stated, the magnetic fluxes Φ1, Φ2, Φ3 through the three poles 22 are different in phase by 120° and have the same magnitude, while the equivalent resistances around the regions A1, A2, A3 are set at the same value. As already described, therefore, the induced currents I31, I32, I33 in the plane of the drive member 4 are the same in magnitude and remain delayed by 90° relative to the fluxes Φ1, Φ2, Φ3 while varying with time. Accordingly, the combined electromagnetic force F resulting from superposition of the electromagnetic forces F1, F2, F3 is given by the following equation.

$$\begin{aligned} F &= L0 \cdot (I33 - I32) \cdot \Phi 1/A0 + \\ &\quad L0 \cdot (I31 - I33) \cdot \Phi 2/A0 + \\ &\quad L0 \cdot (I32 - I31) \cdot \Phi 3/A0 \\ &= 2 \cdot \omega \Phi 0 \cdot L0 \cdot \{\sin(120°) + \sin(120°) + \sin(120°)\}/(r3_0 \cdot A_0) \end{aligned}$$ Eq. 6 where L0 is the width of the magnetic pole 22 or 32, and A0 is the cross sectional area of the pole 22 or 32. The equation indicates that the force F is always definite in magnitude and direction independently of time t and is free of vibration. In the case where the drive member 4 is cylindrical, the force F is a rotational force acting circumferentially thereof to rotatingly move the drive member 4.

Figure 4B:
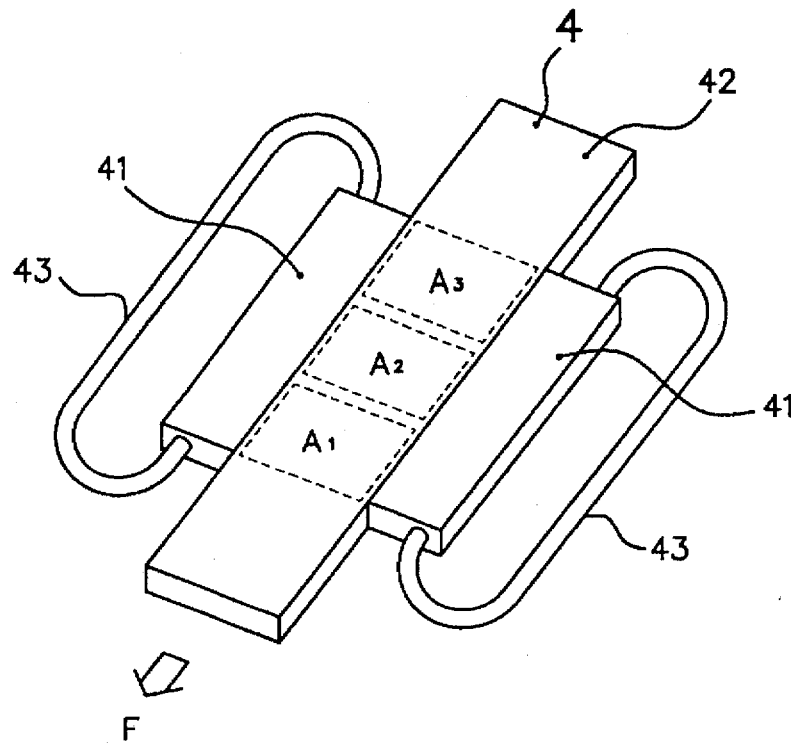
FIG. 4b is a perspective view of an embodiment wherein a drive member 4 is movable straight.
Figure 4C:
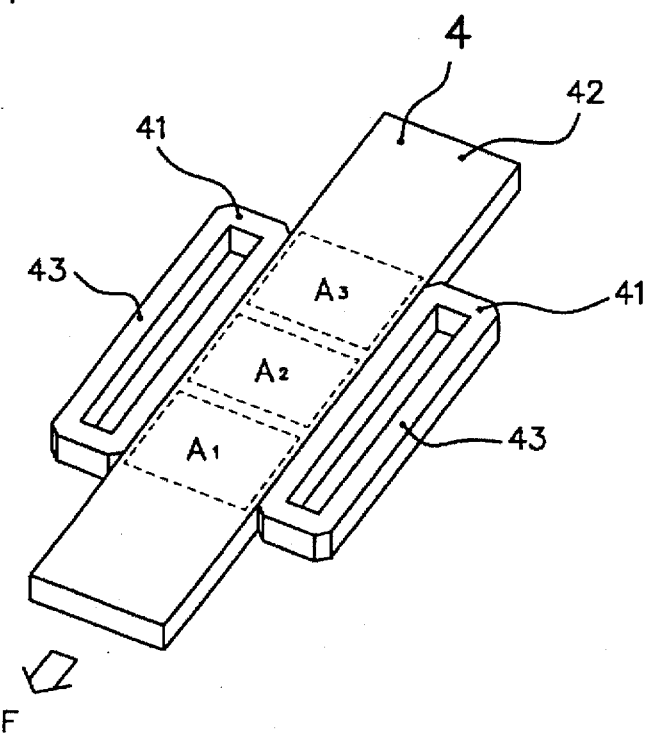
FIG. 4c is a perspective view of another embodiment.

The outer magnetic member 2, inner magnetic member 3 and drive member 4 may be arranged as developed in parallel to a plane as seen in FIG. 1b. As shown in FIG. 4b in this case, a drive portion 42 between the opposite edge portions 41, 41 is separated from the drive member 4, and each edge portion 41 is connected electrically at its opposite ends to an electric circuit 43 comprising an electric wire. The drive portion 42 is made slidable along the edge portions 41, 41. In the case where the drive member 4 is in the form of a planar plate, the electromagnetic force F acts straight to move the drive member 4 straight. FIG. 4c shows an example wherein the edge portion 41 and the electric circuit 43 shown in FIG. 4b are integral.

The number of magnetic poles 22 need not be limited to 3 but can be a multiple of 3, and closed electric circuits 5, 6, 7 are connected to the coils provided on the respective poles. A force of rotation or straight force increased in corresponding relation with the multiple can then be exerted on the drive member 4.

The outer and inner magnetic members 2, 3 may be interchanged. The outer magnetic member 2 is then in the form of a cylinder having a yoke 2 only, and the inner mangetic member 3 is provided with iron cores, poles and coils. The drive member 4 in this case is rotatable or movable straight on the same principle as above.

Embodiments

Figure 5A:
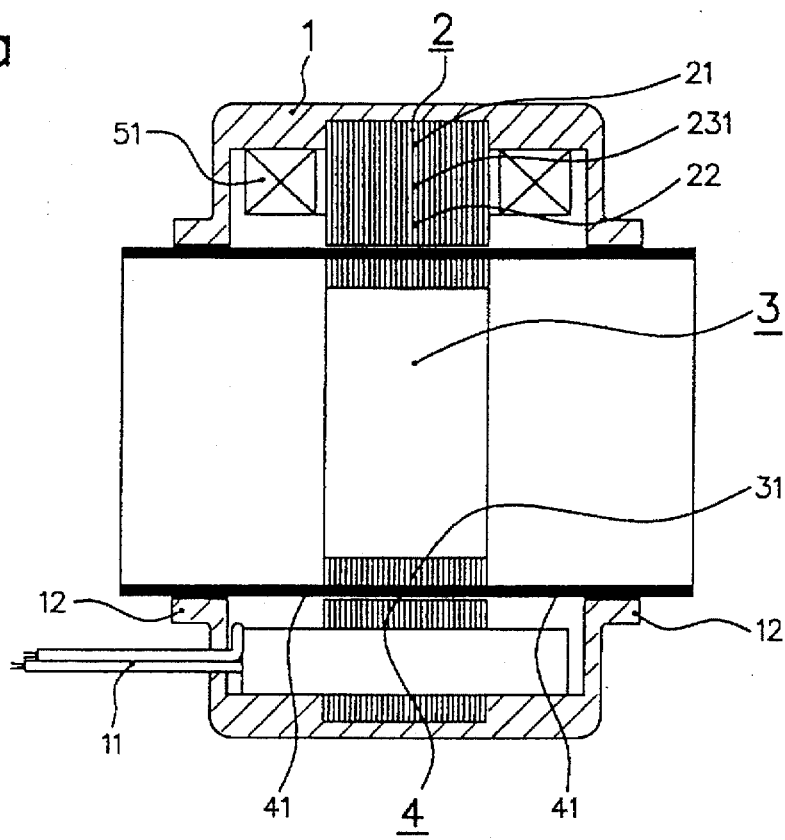
FIG. 5a is a view in longitudinal section of an electromagnetic induction driving device having the basic structure 1.
Figure 5B:
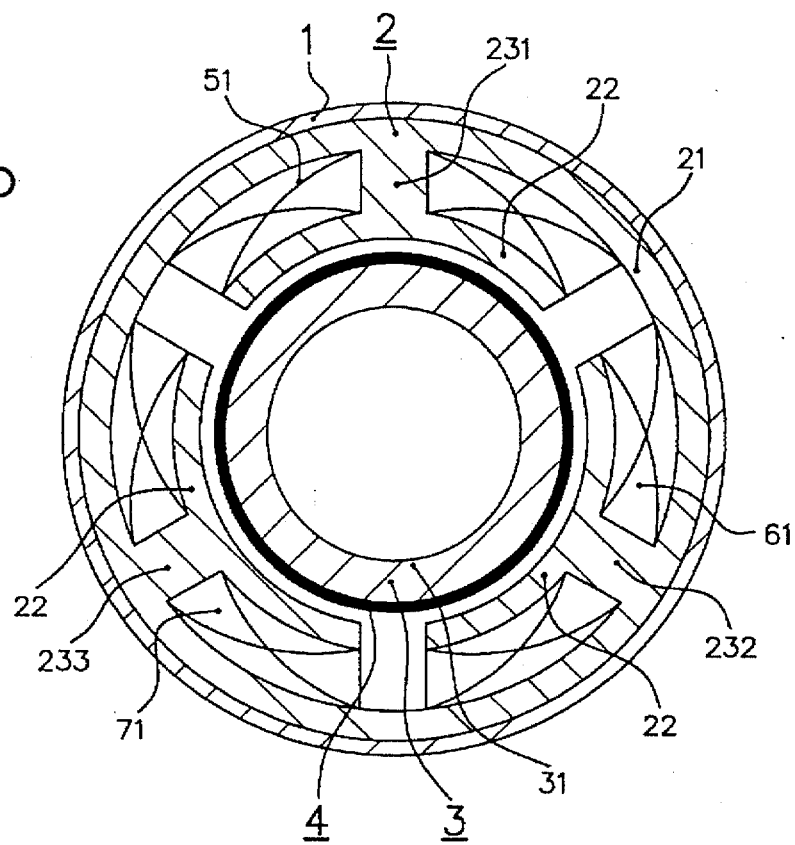
FIG. 5b is a view in section taken along a plane orthogonal to the rotary shaft of the device.

FIGS. 5a and 5b show a specific embodiment having the first basic structure of FIG. 1b.

An outer magnetic member 2 is formed by providing inside a casing 1 a bundle of many pieces which are blanked out in the shape of the member 2 from a plate of iron-type magnetic material having small magnetic resistance, such as a carbon steel plate or silicon steel plate. The outer magnetic member 2 has a cylindrical yoke 21 extending along the inner surface of the casing 1 circumferentially thereof, first, second and third iron cores 231, 232, 233 projecting inward from the yoke 21 and arranged at a spacing of 120°, and circular-arc magnetic poles 22 formed at the inner ends of the respective cores. The first and second cores 231, 232 are provided respectively with a coil 51 for use in common for forward drive and reverse drive and a coil 61 for forward drive. The third core 233 has a coil 71 for reverse drive.

An electric element 63 comprising a capacitor, resistor or the combination thereof is disposed in a suitable space in the casing 1, the terminals (not shown) of closed electric circuits 5, 6, 7 are arranged on a side face of the casing, and conductors 11 of an a.c. power source are connected to suitable terminals, whereby a drive member 4 is made rotatingly movable forward or reversely.

The drive member 4, which is a conductor, is made of a material having great magnetic resistance, i.e., a nonferrous nonmagnetic material such as aluminum, stainless steel, copper, brass or the like.

The drive member 4 is in the form of a cylinder having a uniform wall thickness and concentric with the arcs of the poles 22, and has opposite ends projecting out beyond opposite sides of the casing 1 and rotatably supported by bearings 12 provided on the sides of the casing 1.

An inner magnetic member 3 is made of the same magnetic material as the outer magnetic member 2, and is in the form of a short cylinder having the same width as the poles 22. The illustrated inner magnetic member 3 is opposed to the poles 22, attached to the drive member 4 inside thereof and rotatable with the member 4.

The inner magnetic member 3 may be separate from the drive member 4 and fixed to the casing 1 by suitable means. The drive member 4 only can then be rotated.

With the present embodiment, the direction of rotation of the drive member 4 can be changed merely by changing the connection of the conductors 11 to the terminals on the side face of the casing without necessitating change-over means for reversing the rotation of the drive shaft by a power transmission as in the case of conventional single-phase induction motors.

Further for use with a.c. power sources which are different in frequency or voltage, taps may be provided for specified numbers of turns of the coil. The force of rotation or torque of the drive member 4 can then be maintained at a constant value merely by connecting the conductor 11 to a suitable one of the taps. This eliminates the need for preparing many kinds of motors for use at different power source frequencies or voltages.

Figure 6A:
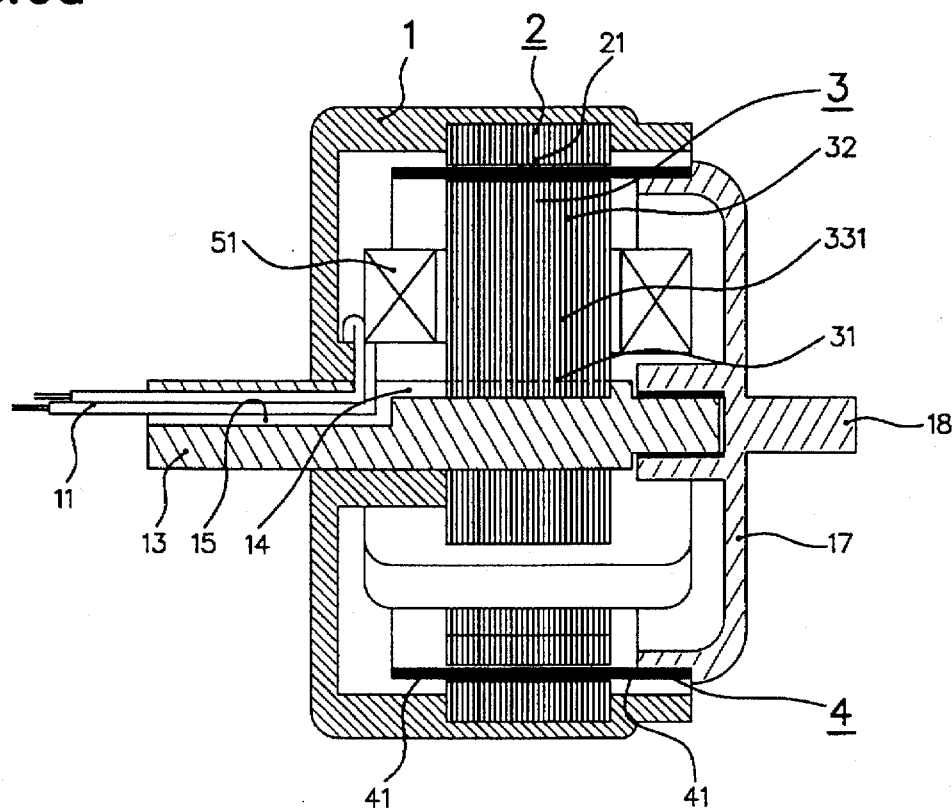
FIG. 6a is a view in longitudinal section of another embodiment.
Figure 6B:
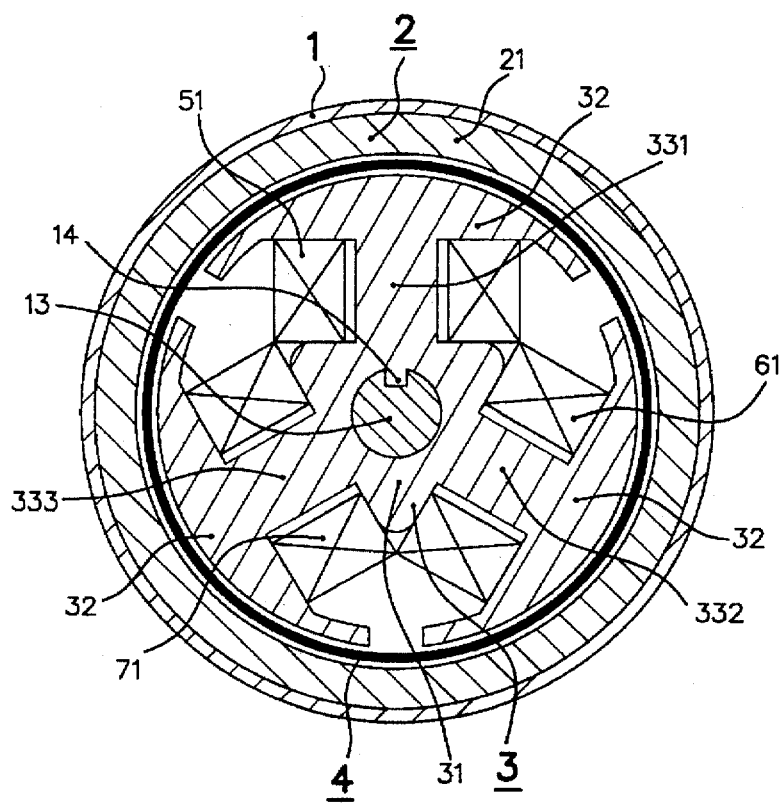
FIG. 6b is a view in section taken along a plane orthogonal to the rotary shaft of the same device.

FIGS. 6a, 6b show a cylindrical yoke 21 attached to a casing 1 inside thereof to provide an outer magnetic member 2. An inner magnetic member 3 has a central yoke 31 fitted in a key groove 14 in a fixed shaft 13 disposed at the center of the casing 1, and is fixedly mounted on the shaft 13. Projecting from the yoke 31 are three iron cores 331, 332, 333 arranged at a spacing of 120° and provided with poles 32 and coils 51, 61, 71, respectively.

The inner surface of the yoke 21 of the outer magnetic member 2 and the outer faces of the poles 32 of the inner magnetic member 3 define a narrow cylindrical space, which has a cylindrical drive member 4 rotatably fitted therein. The right end of the drive member 4 is attached to the periphery of a disk 17 supported by the right end of the fixed shaft 13 to drive a drive shaft 18 projecting from the disk 17 centrally thereof.

The fixed shaft 13 has a bore 15 extending therethrough and holding the inside of the casing 1 in communication with the outside. Conductors 11 extend through the bore 15 into the casing 1 and are connected to terminals Of the coils 51, 61, 71.

Figure 7A:
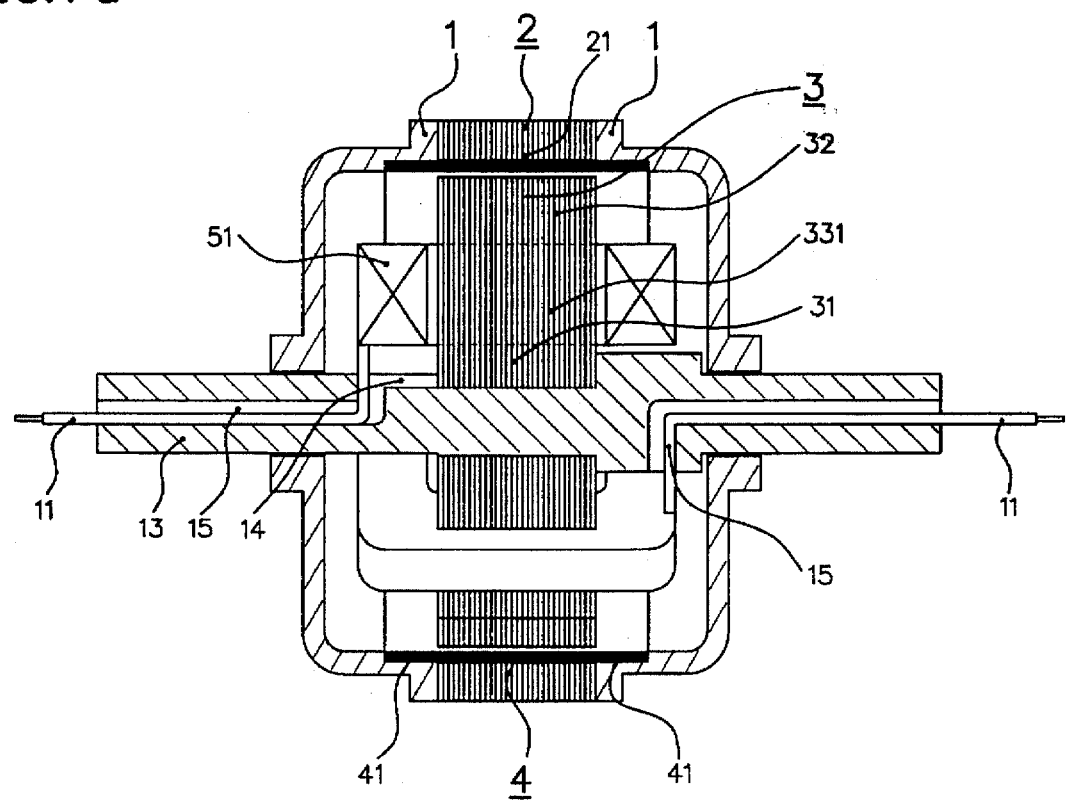
FIG. 7a is a view in longitudinal section of another embodiment.
Figure 7B:
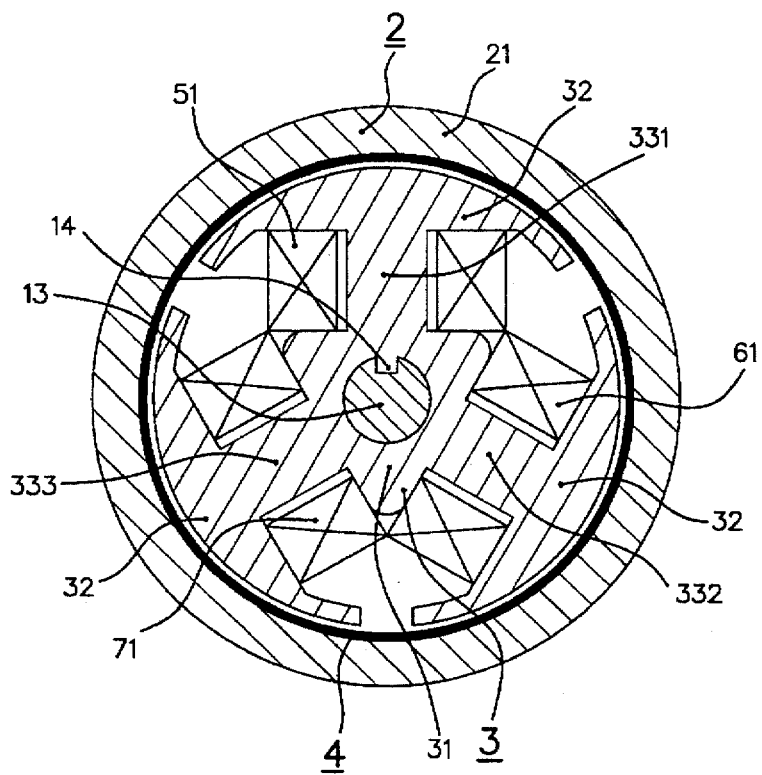

FIGS. 7a and 7b show an inner magnetic member 3 fixedly mounted on a fixed shaft 13 and having a yoke 31, iron cores 331, 332, 333, poles 32 and coils 51, 61, 71. An outer magnetic member 2 is integral with a casing 1 supported by the fixed shaft 13. A drive member 4, which is cylindrical, is attached to the outer magnetic member 2 inside thereof.

Conductors 11 extend into the casing via through the bores 15, 15 formed in the fixed shaft 13 at its opposite side portions and are connected to terminals of the coils 51, 61, 71. When a current is passed through the conductors 11, the casing 1, the outer magnetic member 2 and the drive member 4 rotate together.

For example, fan blades or like members, when attached to the outer periphery of the casing 1 or outer magnetic member 2, can be driven directly without the necessity of providing a transmission. This provides a compacted electric device which is operable with a reduced noise and diminished mechanical loss.

Figure 14:
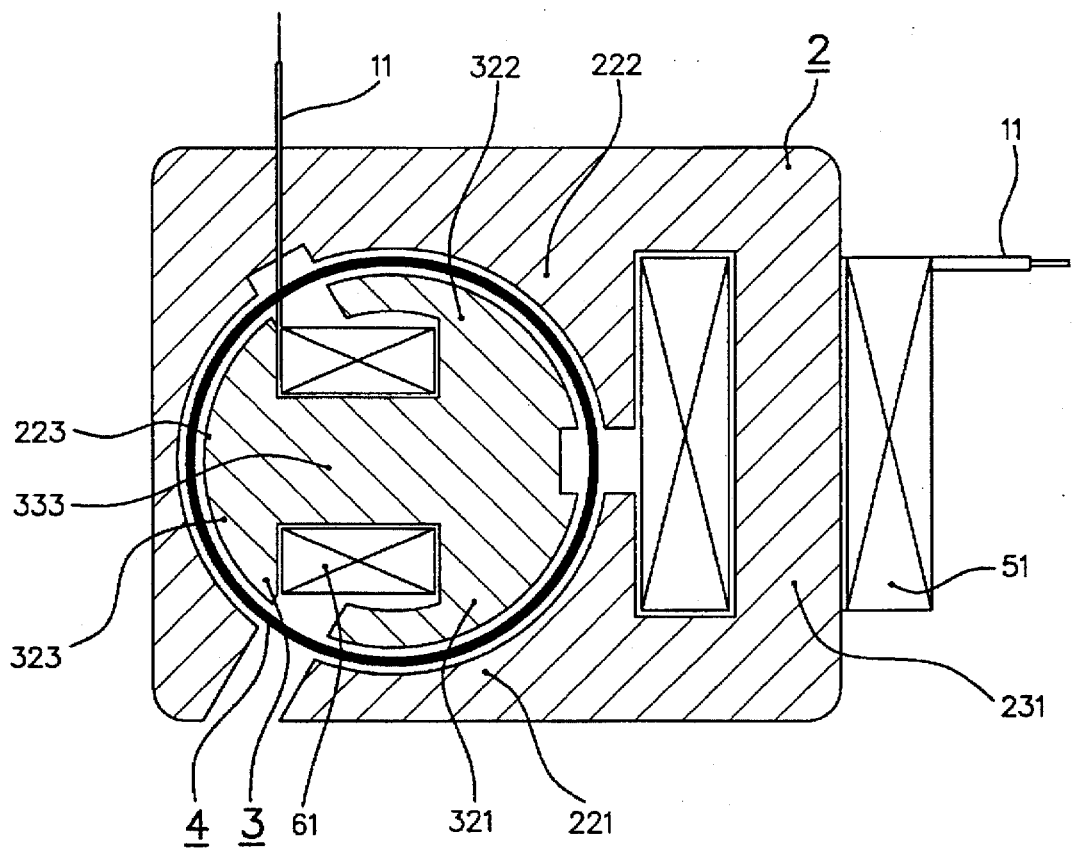
FIG. 14 is a view in longitudinal section of another embodiment of the basic structure 2.

Another embodiment of different shape is shown in FIG. 14. With this device, an outer magnetic member 2 has a core 231 provided with a coil 51, and an inner magnetic member 3 has a core 333 provided with a coil 61. The inner magnetic member 3 has no yoke 31 but has the single core 333 only. The inner periphery of a drive member 4 is substantially covered with poles 321, 322, 323, one of which is disposed at one side of the core 333, the other two poles being arranged at the other side of the core. The outer magnetic member 2 has no yoke 21 but has one core 231 only. The outer periphery of the drive member 4 is substantially covered with poles 221, 222, 223, one of which is disposed at one end of the core 231, the other two poles being arranged at the other end of the core. The coil 51 is connected to an unillustrated a.c. power source to provide a closed electric circuit 5. The coil 61 is connected in series with an unillustrated electric element 63 to provide a closed electric circuit 6. When the conditions for the electric and magnetic circuits are so determined as to produce a phase difference of 120° by applying Kirchhoff's first and second laws to the relationship between the number of turns and equivalent resistance r2 of the coil 61 and the equivalent resistances r31, r32, r33 of the drive member 4, the equivalent magnetic resistance of the closed magnetic circuit, and the impedance of the electric element 63, the current I3 induced in the drive member 4 and magnetic flux Φ penetrating the member 4 produce an electromagnetic force F on the drive member 4 to rotatingly move the member 4.

Figure 8:
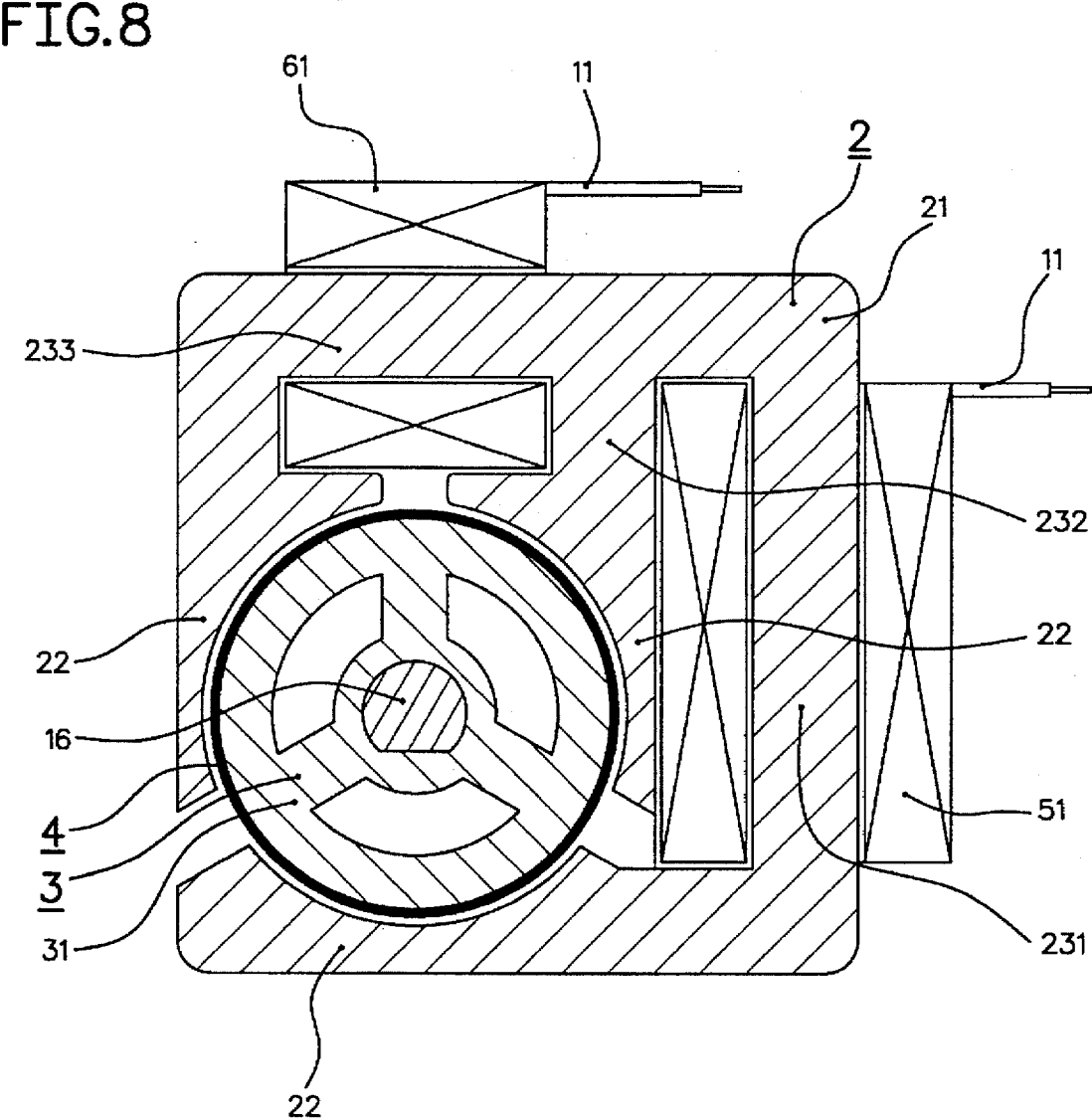
FIG. 8 is a sectional view of another embodiment.

FIG. 8 shows an embodiment wherein the outer magnetic member 2 of the basic structure 1 shown in FIG. 1a has a rectangular-outer peripheral contour. With this device, a yoke 21 of the outer magnetic member 2 has two cores 231, 232 projecting from one end thereof and a core 233 projecting from the other end thereof. The cores 231, 233 are provided with coils 51, 61, respectively. The coil 51 is connected to an a.c. power source 52 forming a portion of a closed electric circuit 5, while the coil 61 is connected in series with an electric element 63 comprising a capacitor, resistor or the combination thereof to provide a closed electric circuit 6. The cores 231, 232, 233 are provided with poles 22, the inner faces of which form a cylindrical shape in proximity to the outer periphery of a drive member 4. The drive member 4 is cylindrical, and an inner magnetic member 3 has a yoke 31 joined to the inner periphery of the drive member 4. The outer magnetic member 2 of the basic structure 1 has a modified shape for use in the present embodiment, and the inner magnetic member 3 and the drive member 4 in the form of an integral piece rotate on the same operating principle as already described. The contour of the outer magnetic member 2 can be modified as desired as in the case of the present embodiment.

Second Basic Structure

Figure 9A:
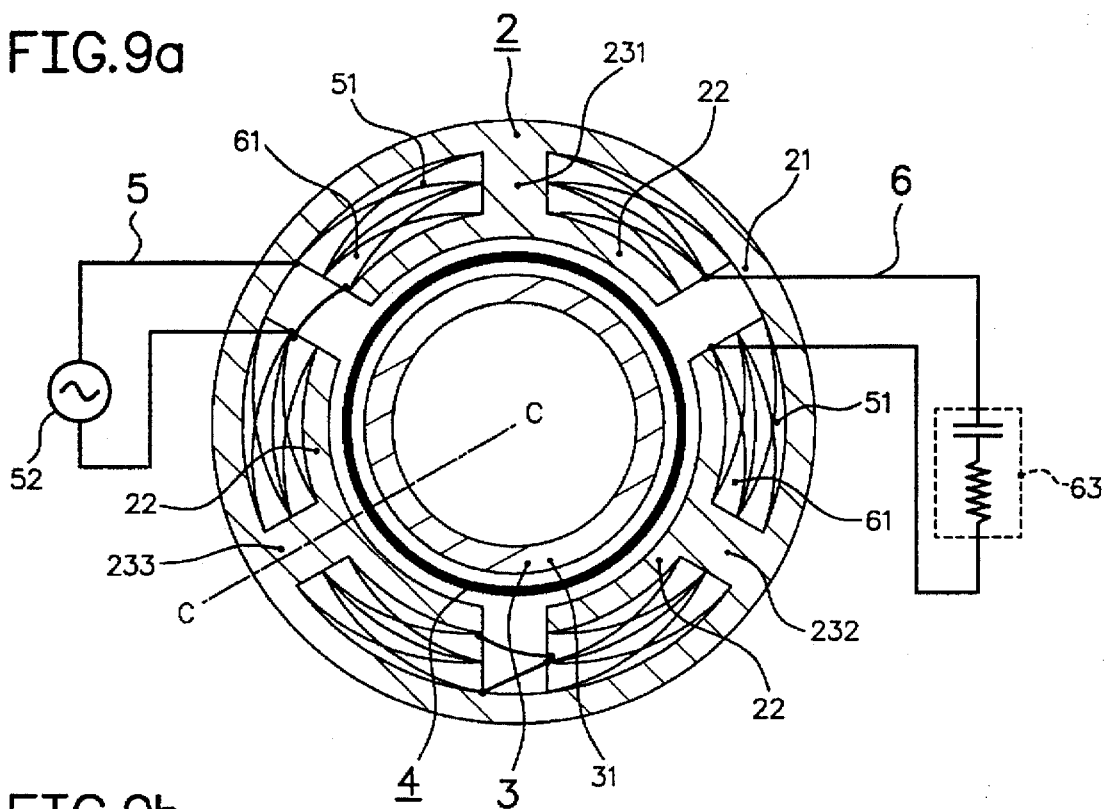
FIG. 9a is a view of an electromagnetic induction driving device of the invention to show a basic structure 2, the view being in section taken along a plane orthogonal to its rotary shaft.
Figure 9B:
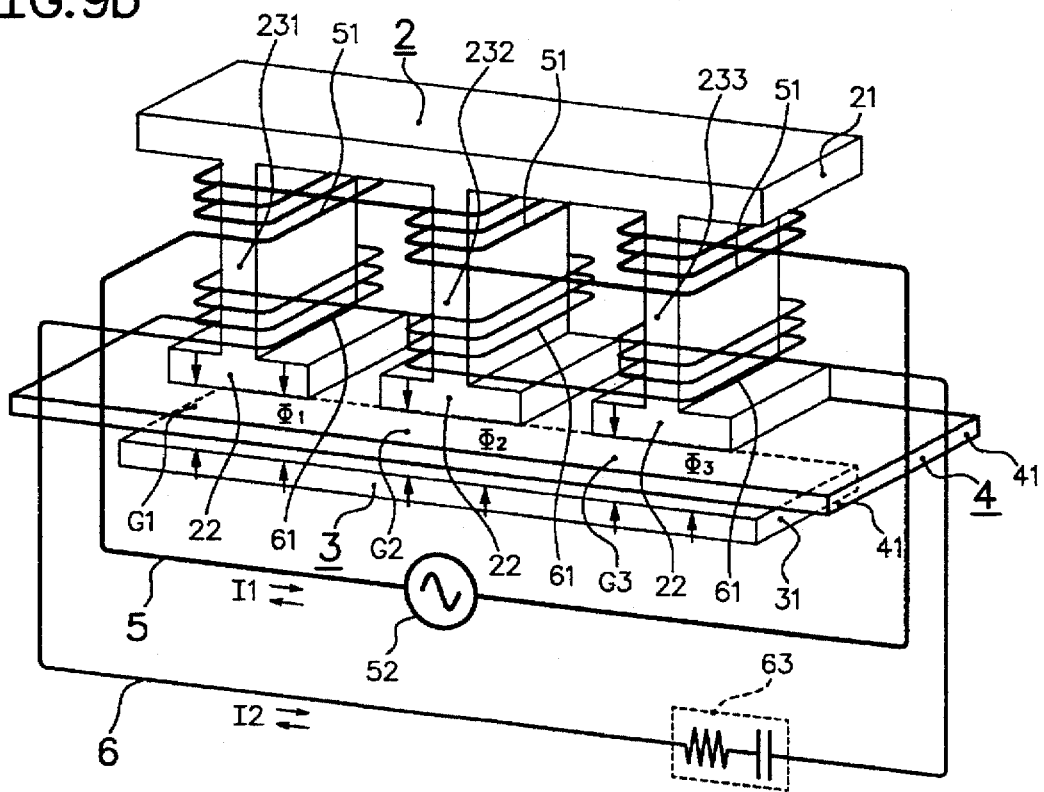
FIG. 9b is a perspective view of the device as cut along the line C—C in FIG. 9a and developed.

FIG. 9a shows the second basic structure of the present invention. For the ease of description, FIG. 9b shows the structure of FIG. 9a as cut along the line C—C in FIG. 9a and developed into an arrangement on a plane. In FIGS. 9a and 9b, like parts are designated by like reference numerals. The structure is modified into various embodiments as will be described later. An outer magnetic member 2 has three iron cores 231, 232, 233 projecting inward from a yoke 21, arranged at a spacing of 120° and each having an enlarged inner end to provide a magnetic pole 22 having a circular-arc inner face. The poles 22 of the outer magnetic member 2 are arranged close to one another and are so dimensioned as to substantially cover the length of a drive member 4. An inner magnetic member 3 comprises a yoke 31 in the form of a cylinder concentric with the inner face arcs of the poles 22 of the outer magnetic member 2. The drive member 4 to be described below is disposed between the inner magnetic member 3 and the poles 22.

As shown in FIG. 9b, each of the cores 231, 232, 233 of the outer magnetic member 2 has two independent upper and lower coils wound in the same direction. The finishing end of one of the coils on each core is connected to the starting end of one of the coils on another core adjacent thereto to provide first coils 51 which are connected to one another for all the cores 231, 232, 233. The other coils are similarly connected to one another to provide second coils 61.

The coils 51 are connected in series with an a.c. power source 52, for example, of 60 Hz to provide a closed electric circuit 5. The coils 61 are connected in series with an electric element 63 comprising a capacitor, resistor or the combination thereof to form a closed electric circuit 6. When the circuit 5 is energized by the power source 52 connected thereto, the coil 51 on each core produces magnetic flux thereon. Thus, fluxes Φ1, Φ2, Φ3 penetrate the drive member 4 across respective gaps G1, G2, G3 defined by the yoke 31 and the cores 231, 232, 233. As to the relationship between the number of turns of the coils 61 and equivalent resistance r2 thereof, equivalent resistances r31, r32, r33 of the drive member 4, equivalent magnetic resistances of gaps G1, G2, G3 of the magnetic circuit and impedance of the electric element 63, the electric and magnetic circuit conditions are so determined as to displace the fluxes Φ1, Φ2, Φ3 by 120° in phase and give the same magnitude to the fluxes.

The drive member 4 has the same shape as in the basic structure 1, is rotatably disposed between the yoke 31 of the inner magnetic member 3 and the poles 22 of the outer magnetic member 2 and has edge portions 41, 41 at its opposite sides outside the regions where the poles 22 are opposed to the yoke 31.

Drive Principle

The drive member 4 operates on the following principle. The regions where the member 4 is positioned in the gaps G1, G2, G3 between the inner magnetic member 3 and the magnetic poles of the outer magnetic member 2 will be referred to by A1, A2, A3, respectively.

When the closed electric circuit 5 is energized by the a.c. power source 52, each coil produces magnetic flux. Suppose the coils 51, 61 have equivalent resistances r1, r2, respectively.

When the circuit 5 is energized by the power source 52, a current I1 flows through the circuit so that the sum of electric power induced in the coil 51 by the flux Φ through the core and a voltage drop due to the equivalent resistance r1 will be in balance with the power source voltage at all times. A current I2 flows through the closed electric circuit 6 so that the sum of the equivalent resistance r2 and a voltage drop due to the impedance of the electric element 63 will be zero at all times.

The flux produced on the first coil 51 and second coil 61 on each of the cores 231, 232, 233 by the currents I1 and I2 forms a closed magnetic circuit originating from the core carrying the coils. For example, the flux produced by the coil 51 around the second core 232 extends from the pole 22 through the drive member 4 at the gap G2 and region A2 to the yoke 31 of the inner magnetic member 3, passes through the yoke 31, separates into two portions, which then penetrate the drive member 4 at the regions A1, A2 in the gaps G1, G2 to reach poles 21 of the outer magnetic member 2, pass through the cores 231, 233 and join at the yoke 21 and return to the core 232, thus forming a closed magnetic circuit or reverse closed magnetic circuit. Similarly the coils 51, 61 on the cores 231, 232, 233 each form a closed magnetic circuit. The fluxes of the respective closed magnetic circuits are combined together. The fluxes extending from the poles 22 of the cores 231, 232, 233 to the yoke 31 through the gaps G1, G2, G3 and the regions A1, A2, A3 will be indicated at Φ1, Φ2, Φ3, respectively. When the conditions for the electric and magnetic circuits are so determined as to produce a phase difference of 120° by applying Kirchhoff's first and second laws to the relationship between the numbers of turns and equivalent resistances r1, r2 of the coils 51, 61, the equivalent resistances r31, r32, r33 of the drive member 4, the equivalent magnetic resistances of the gaps G1, G2, G3 of the closed magnetic circuits and the impedance of the electric element 63, the fluxes Φ1, Φ2, Φ3 available are expressed by Eq. 3 and Eq. 4.

Assuming that the equivalent resistance of the drive member 4 around the regions A1, A2, A3 is r30, the currents I31, I32, I33 induced by the fluxes Φ1, Φ2, Φ3 are expressed by Eq. 5.

Thus, as shown in FIGS. 3a to 3c relating to the first basic structure, the induced current I3 has a waveform which is delayed by 90° in phase relative to the flux Φ, and there is the relationship of Φ1+Φ2+Φ3=0 at optional time t0. As is the case with the first basic structure, therefore, electromagnetic forces F1, F2, F3 are produced respectively by the flux Φ1 penetrating the region A1 of the drive member 4 and the induced currents I32, I33 across the region A1, by the flux Φ2 penetrating the region A2 and the induced currents I31, I33 across the region A2, and by the flux Φ3 penetrating the region A3 and the induced currents I31, I32 across the region A3. As in the case of the first basic structure, these forces act on the drive member 4.

The combined electromagnetic force F resulting from the superposition of the forces F1, F2, F3 generated in the drive member 4 is expressed by Eq. 6. The force F is always definite in magnitude and direction independently of time t and is free of vibration. The force is a force of rotation acting on the drive member 4 circumferentially thereof or a straight force to translate the member 4 as will be described below, rotating the drive member 4 or moving the member 4 straight.

The outer magnetic member 2, inner magnetic member 3 and drive member 4 may be arranged as developed in parallel to a plane as shown in FIG. 9b. As shown in FIGS. 4b and 4c for the first basic structure, a central drive portion 42 is separated from the edge portions 41, 41 at opposite sides, and each edge portion 41 is connected electrically at its opposite ends to an electric circuit 43. The drive portion 42 is slidable along the edge portions 41, 41 to move the member 4 straight.

The number of poles 22 need not be limited to 3 but can be a multiple of 3, and closed electric circuits 5, 6 are connected to the coils provided on the respective poles. A force of rotation or straight force increased in corresponding relation with the multiple can then be exerted on the drive member 4.

Figure 10:
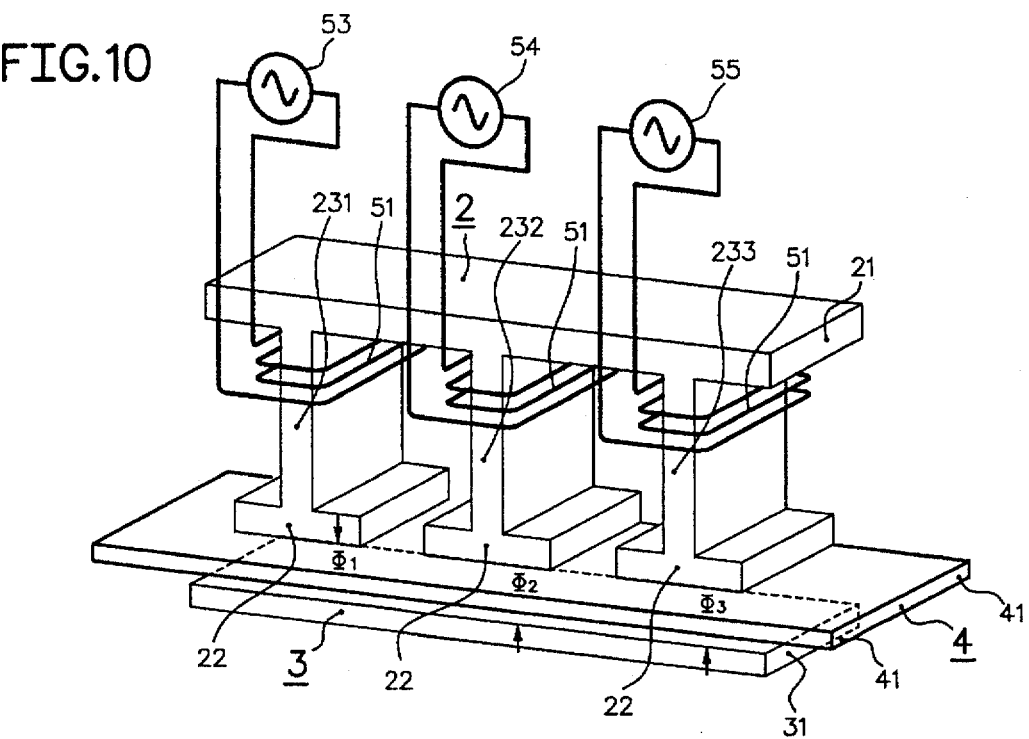
FIG. 10 is a perspective view showing the device as connected to three-phase a.c. power sources.

FIG. 10 shows iron cores 231, 232, 233 each provided with one coil 51, and the coils 51 are connected respectively to power sources 53, 54, 55 which are different from one another by 120° in phase, for example, to a three-phase power supply. The drive member 4 included in this arrangement can be rotated or moved straight similarly on the foregoing principle.

Figure 11A:
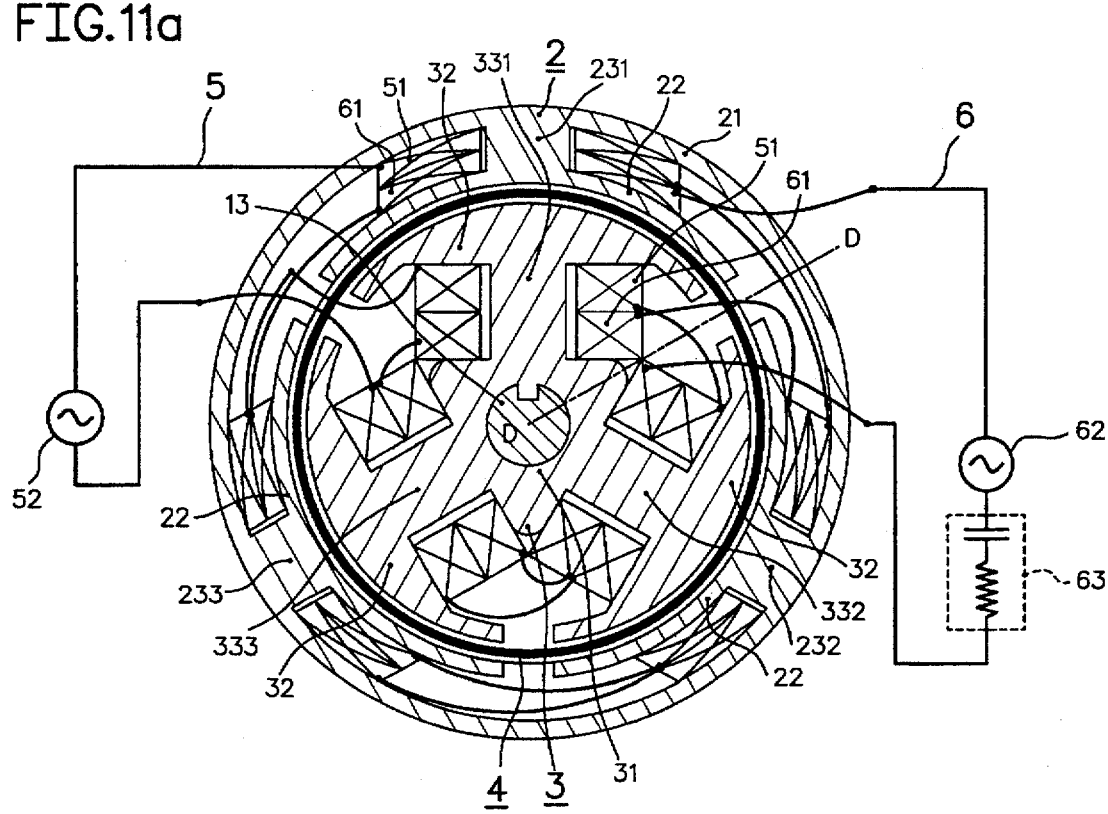
FIG. 11a is a view showing another electromagnetic induction driving device having the basic structure 2 of the invention, the view being in section taken along a plane orthogonal to its rotary shaft.
Figure 11B:
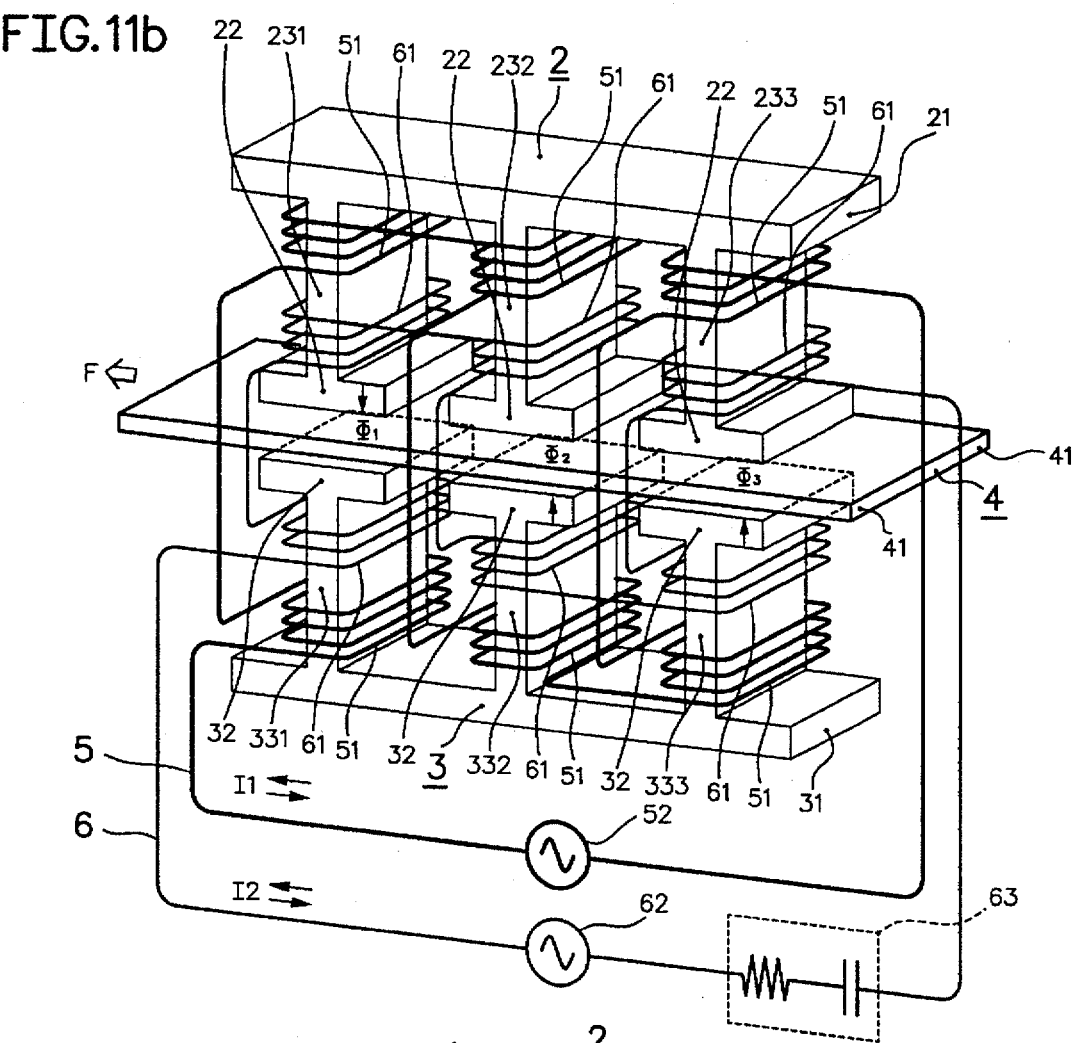
FIG. 11b is a perspective view of the device as cut along the line D—D in FIG. 11a and developed.

The structure of FIG. 9a is further developed into the structure of FIG. 11a, in which an inner magnetic member 3 also has three iron cores 331, 332, 333 projecting outward from a cylindrical yoke 31 and each having an enlarged end to provide a magnetic pole 32 having a circular-arc outer face. The poles 32 are arranged as opposed to the respective poles 22 of the outer magnetic member 2, and the opposed portions are made approximately the same in shape and area. The poles 22, 32 of the outer and inner magnetic members 2, 3 are closely positioned and are so dimensioned as to substantially cover the drive member 4 over the entire circumference. Each of the cores 331, 332, 333 of the inner member 3 also has two independent coils 51, 61. The first coils 51 are connected in such order that the finishing end of the coil 51 on one core 331 of the inner member 3 is connected to the starting end of the coil 51 on one core 231 of the outer member 2. The finishing end of this coil 51 is connected to the starting end of the coil 51 on the adjacent core 332 of the inner member 3 again. In this way, the coils 51 on the cores of the inner and outer members 3, are alternately connected in series. Similarly the other coils 61 are also connected in series. In a closed electric circuit 5, the coils 51 are connected in series with an a.c. power source 52. In a closed electric circuit 6, the coils 61 are connected in series with an a.c. power source 62 by way of an electric element 63. As is the case with the structure of FIG. 9a, the equivalent resistance r2 and the impedance of the electric element 63 are so adjusted that the fluxes Φ1, Φ2, Φ3 penetrating the regions A1, A2, A3 are different by 120° in phase as expressed by Eq. 3 and Eq. 4 to produce induced currents I31, I32, I33 as expressed by Eq. 5, whereby electromagnetic forces F1, F2, F3 are produced on the drive member 4 at the respective regions A1, A2, A3. These forces are combined into an electromagnetic force F, by which the drive member 4 is rotated or moved straight.

Embodiments

Figure 12:
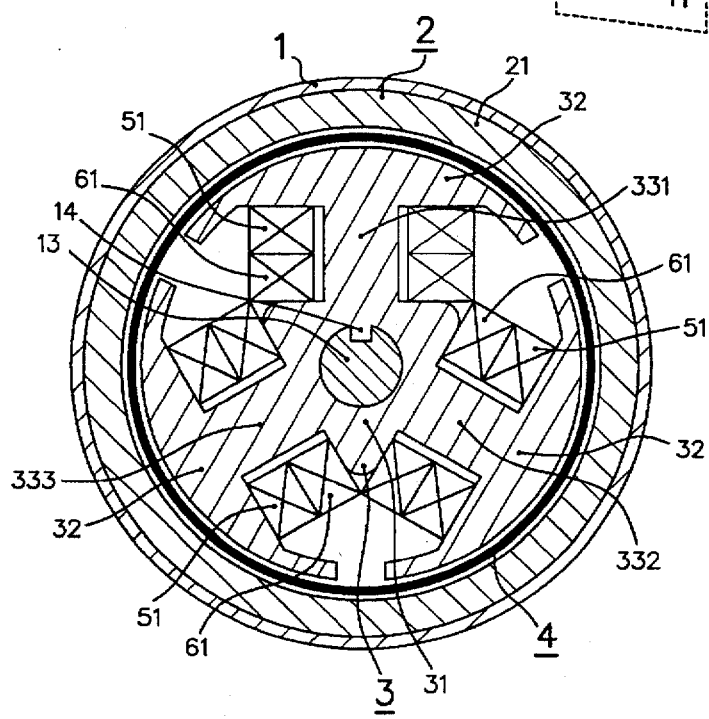
FIG. 12 is a view in vertical section of another embodiment of the basic structure 2.

FIG. 12 shows an embodiment wherein an inner magnetic member 3 has a central yoke 31 fixedly fitted in a key groove 14 in a fixed shaft 13, and an outer magnetic member 2 comprises a cylindrical yoke 21 and is attached to a casing 1 inside thereof. A drive member 4 is freely rotatably disposed in a narrow cylindrical space defined by the yoke 21 of the outer member 2 and poles 32 of the inner member 3.

Figure 13A:
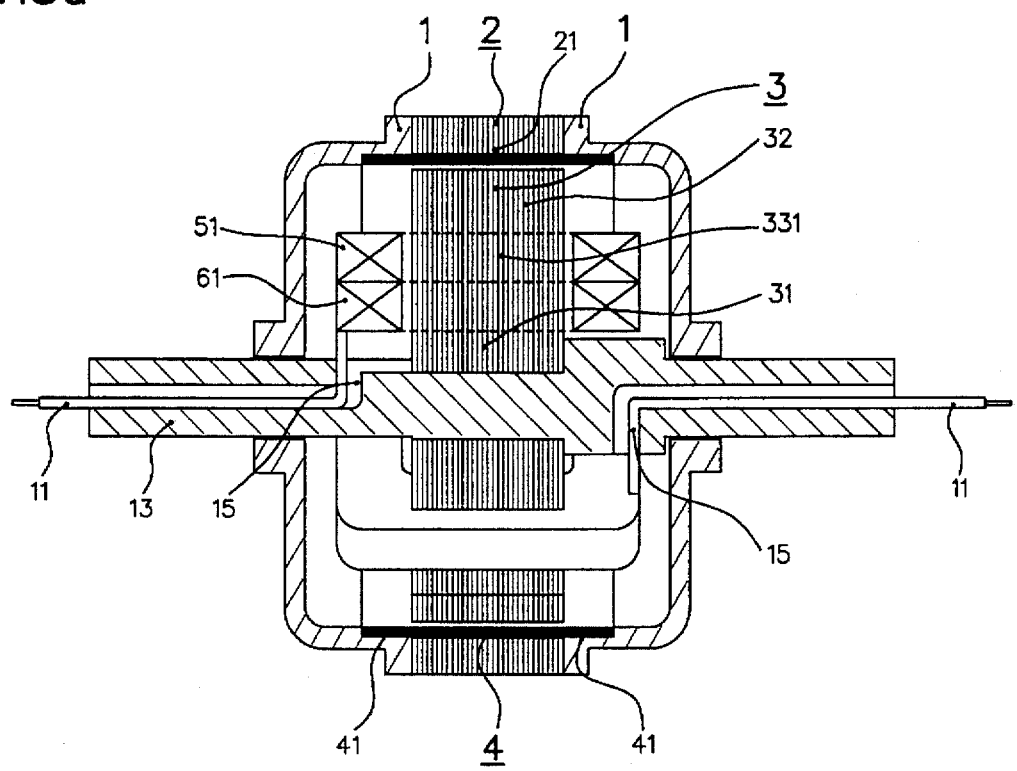
FIG. 13a is a view in longitudinal section of another embodiment of the basic structure 2.
Figure 13B:
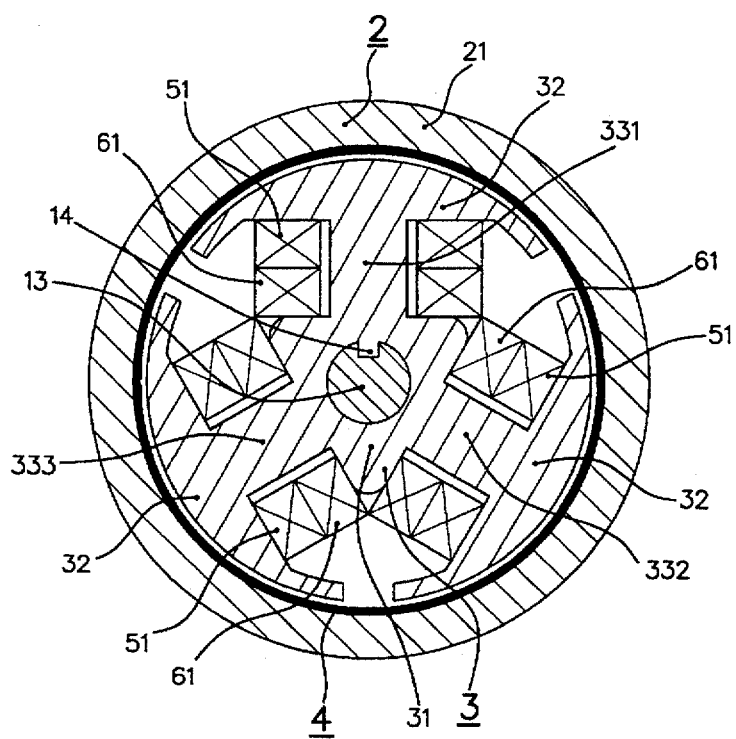
FIG. 13b is a view showing the device of FIG. 13a in section as cut by a plane along its rotary shaft.

FIG. 13a shows an inner magnetic member 3 having first and second coils 51, 61 on each core thereof, an outer magnetic member 2 comprising a yoke 21, and a drive member 4 joined to the yoke 21. FIG. 13b is a sectional view of the device of FIG. 13a as cut along a plane orthogonal to its rotary shaft. The construction of the device will be described specifically below.

A bundle of many cylindrical plate pieces blanked out from a plate of ferrous magnetic material having small magnetic resistance, such as a carbon steel plate or silicon steel plate, is disposed between casings 1, 1 to provide the outer magnetic member 2.

The drive member 4 is a cylinder having a greater length than the outer magnetic member 2, and has a central portion held in intimate contact with the inner surface of the outer member 2 and opposite edge portions 41, 41 attached to the inner surface of the casings 1.

The inner magnetic member 3 is made of the same magnetic material as the outer magnetic member 2, and has a cylindrical yoke 31, iron cores 331, 332, 333 projecting outward from the yoke 31 and arranged at a spacing of 120°, and a circular-arc pole 32 formed at the outer end of each core. The first coil 51 and the second coil 61 are wound in the same direction on each core and are independent of each other. The inner magnetic member 2 is fixed to a fixed shaft 13. The drive member 4 is attached to the inner surface of the outer magnetic member 2. The assembly of the casings 1, 1, outer member 2 and drive member 4 is rotatably provided on the fixed shaft 13.

An electric element 63 comprising a capacitor, resistaor or the combination thereof is disposed in a suitable space inside the casings 1, 1, and terminals (not shown) of closed electric circuits 5, 6 are arranged on the side face of the casing 1. Conductors 11 of a.c. power sources are connected to suitable terminals to rotate the outer magnetic member 2 with the drive member 4.

The material and shape of the drive member 4 are the same as in the basic structure 1.

The fixed shaft 13 has through the bores 15 holding the inside of the casings 1 in communication with the outside. The conductors 11 extend through the bores 15 inside the casings 1 and connected to the terminals of the coils 51, 61.

When the closed electric circuits 5, 6 of the foregoing two embodiments are energized by the a.c. power sources 52, 62, closed magnetic circuits including the respective poles 32 are formed based on the foregoing principle, whereby the drive member 4 or the outer magnetic member 2 joined to the member 4 is rotated. When taps are provided for specified numbers of turns of the coils, the force of rotation of the drive member 4 can be maintained at a constant value merely by connecting the conductor 11 to a suitable one of the taps. This eliminates the need for preparing many kinds of motors for use at different power source frequencies or voltages as is the case with the first basic structure.

In the case where the casing 1 and the outer magnetic member 2 are made rotatable together, fan blades or the like, if attached to the outer periphery of these components, can be directly driven as in the case of the first basic structure.

Figure 15A:
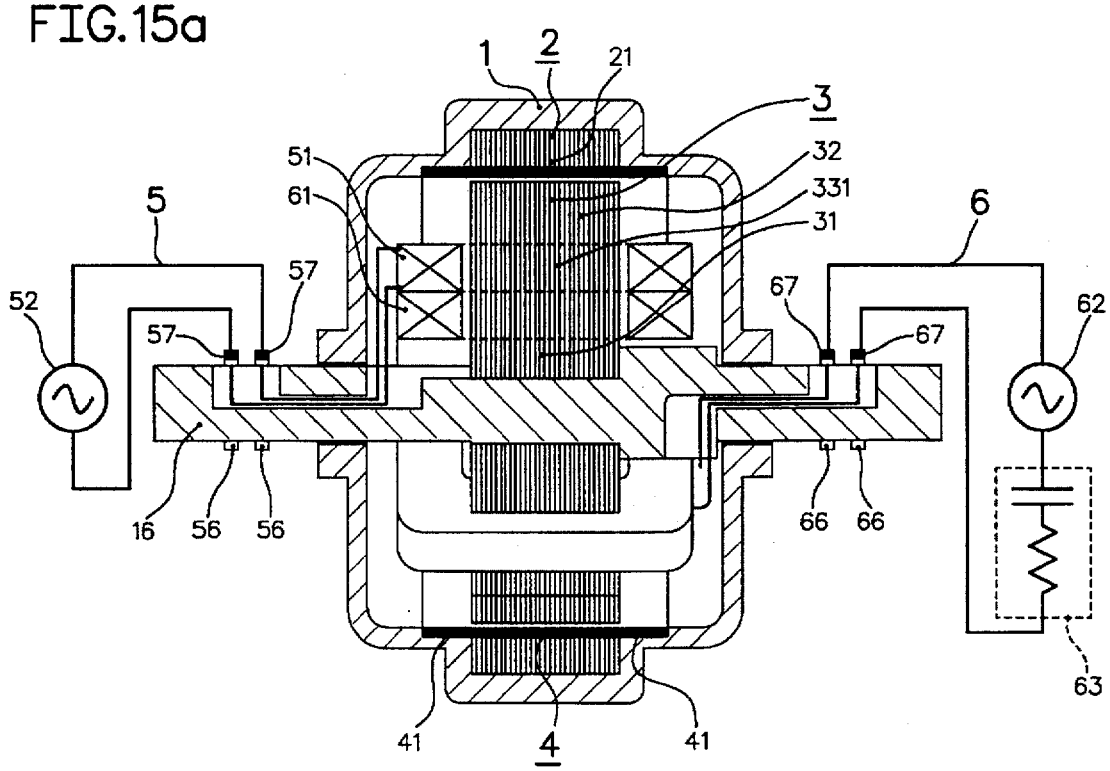
FIG. 15a is a view in longitudinal section of another embodiment of the basic structure 2.
Figure 15B:
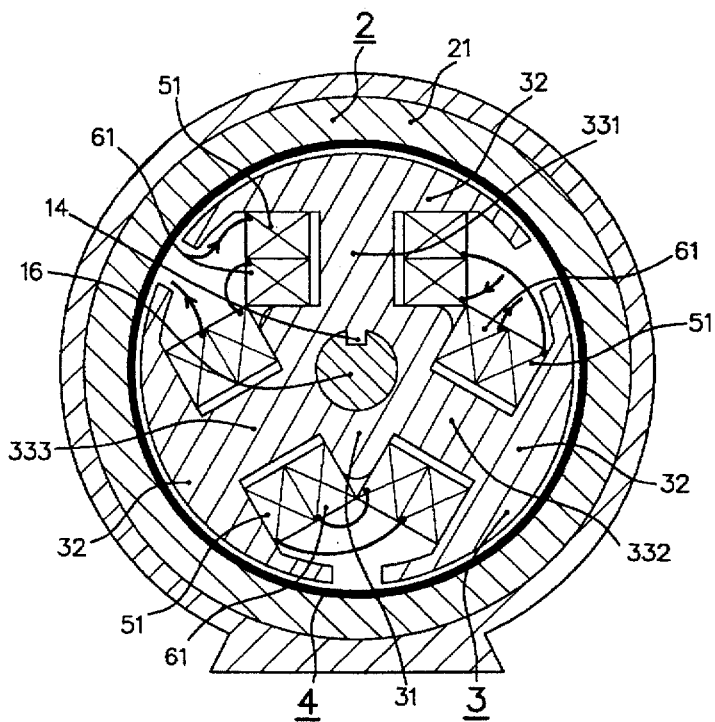
FIG. 15b is a sectional view showing the device of FIG. 15a as cut by a plane along the rotary shaft of the device.

FIGS. 15a, 15b show an outer magnetic member 2 and a drive member 4 which are joined together and fixed to a casing 1. An inner magnetic member 3 has a cylindrical yoke 31 fixed to a rotary shaft 16 rotatably supported by the casing 1, three iron cores 331, 332, 333 projecting outward from the yoke 31, and poles 32 having their outer faces positioned close to the inner periphery of the drive member 4. Coils 51 provided on the inner member 3 are connected to an a.c. power source 52 via slip rings 56 and brushes 57 to constitute a closed electric circuit 5. Coils 61 are connected to an a.c. power source 62 via slip rings 66 and brushes 67 and by way of an electric element 63 to constitute a closed electric circuit 6. Since the outer magnetic member 2 is fixed to the drive member 4, energization of the coils 51, 61 by the power sources 52, 62 causes the inner magnetic member 3 to rotate with the rotary shaft 16, from which the torque is available. The construction described is similarly applicable also the first basic structure. Alternatively, the coils 51, 61 may be provided on the outer magnetic member 2 which is made freely rotatable, with the inner magnetic member 3 held stationary.

FIGS. 16a to 16f show embodiments of the invention having the first or second basic structure for various uses. These devices can be driven based on the principle of either the first basic structure or the second basic structure.

Figure 16A:
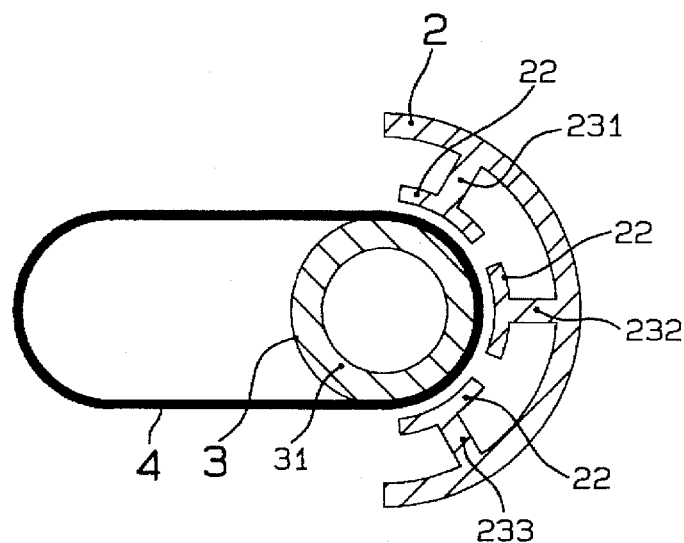
FIGS. 16a to 16f are perspective views showing embodiments of the invention for various uses.

FIG. 16a shows a device of the invention serving as the drive source for a belt conveyor. The device comprises an outer magnetic member 2 provided with coils (not shown), an inner magnetic member 3 comprising a cylindrical yoke 31 which is rotatably supported, and a drive member 4 in an endless form and made of a conductive nonmagnetic material having high elasticity. The surfaces of the drive member 4 and the inner magnetic member 3 are given increased friction resistance to eliminate slippage. The outer magnetic member 2 is semicircular and partly left open to permit the drive member 4 to move into and out of the member 2, whereas closed magnetic circuits are formed between the outer and inner magnetic members 2, 3. When the device is energized by a.c. power source, the inner member 3 and the drive member 4 rotate or revolve for the drive member 4 to serve directly as the belt of a belt conveyor.

Figure 16B:
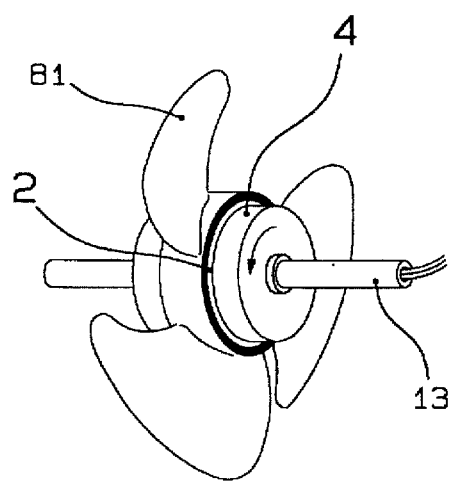
Figure 16C:
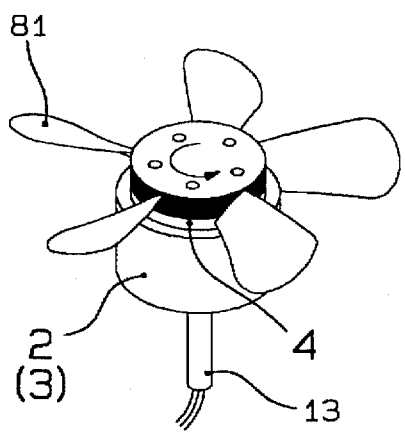

FIG. 16b shows an embodiment wherein an outer magnetic member 2 and a drive member 4 are joined together and freely rotatably supported, and fan blades 81 are attached to the outer periphery of the outer member 2. FIG. 16c shows an embodiment comprising an inner magnetic member 3 and a drive member 4 which are joined together and supported rotatably, and fan blades 81 mounted on one end of the drive member 4. When these devices are energized by an a.c. power source, the fan blades 81 are driven.

Figure 16D:
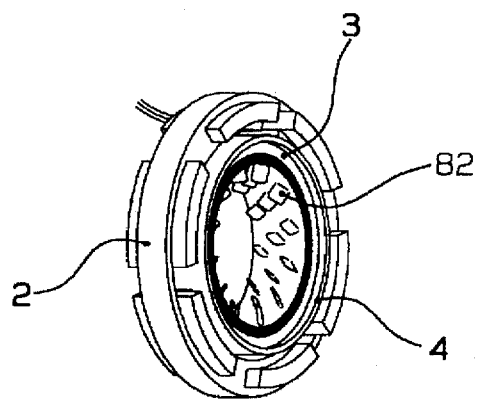

FIG. 16d shows a crusher comprising a fixed outer magnetic member 2, an inner magnetic member 3 and a drive member 4 which are joined together and freely rotatably supported, and cutting blades 82 provided on the inner periphery of the inner member 3. When the device is energized by an a.c. power source, the inner member 3 rotates with the drive member 4 to drivingly revolve the cutting blades 82, whereby materials are crushed with the blades 82.

Figure 16E:
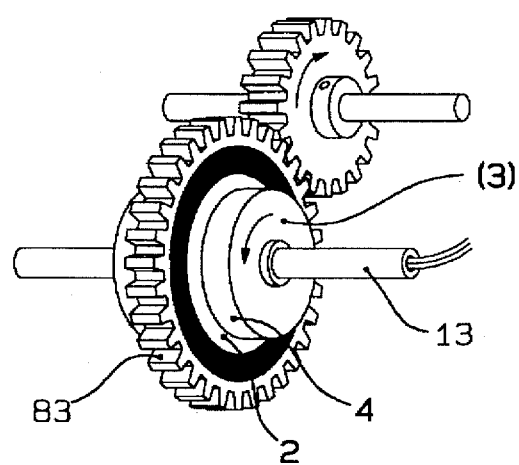
Figure 16F:
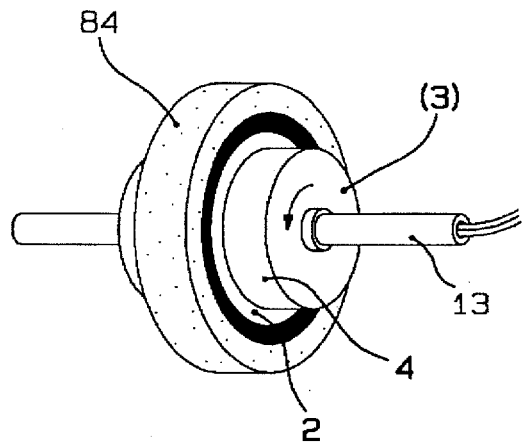

FIGS. 16e and 16f show devices which comprise an outer magnetic member 2 and a drive member 4 which are joined together and freely rotatably supported, a fixed inner magnetic member 3, and a gear 83 or abrasive wheel 84 provided on the outer periphery of the outer member 2. When the device is energized by an a.c. power source, the gear 83 or abrasive wheel 84 is driven for rotation.

Figure 17A:
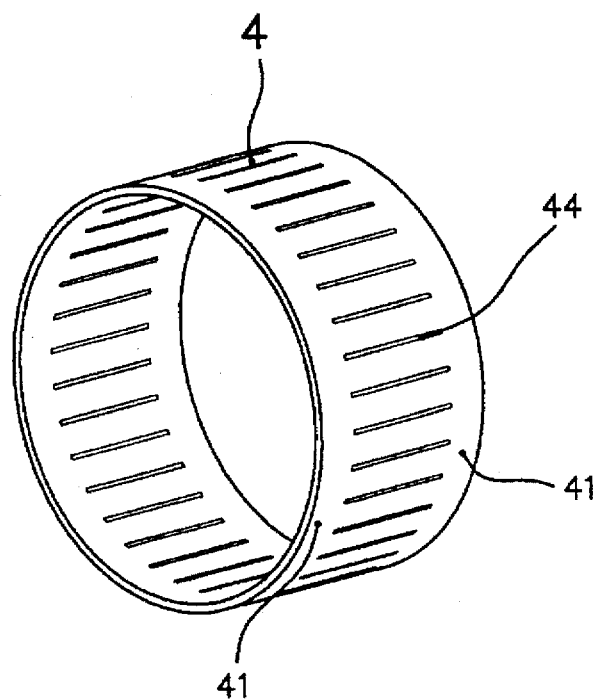
FIGS. 17a and 17b are perspective views showing other embodiments of the drive member 4.
Figure 17B:
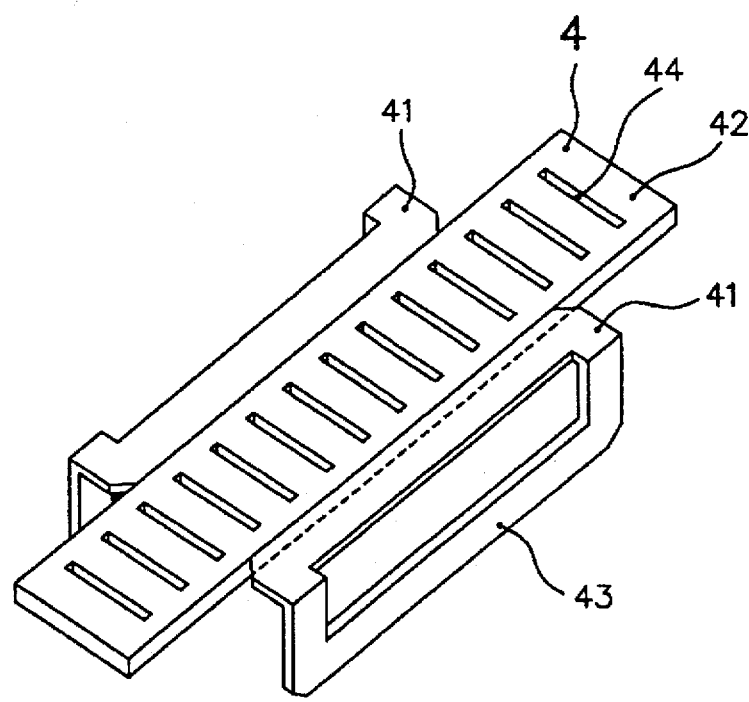

FIGS. 17a and 17b show other embodiments of drive member 4. In FIG. 17a, the drive member 4 is a cylinder having a uniform wall thickness, and has in a direction orthogonal to the direction of rotation a length greater than the width of poles 22. The member 4 has slits 44 extending widthwise thereof and having a length approximately equal to or larger than the width of poles 22 or 32. The drive member 4 of FIG. 17b is a plate having a uniform thickness and, in a direction orthogonal to the direction of straight movement, a length greater than the width of poles 22. A drive portion 42 has a width equal to or smaller than the width of poles 22 or 32, and is formed with slits 44 extending widthwise and smaller than the width. With these embodiments, induced currents flowing in the drive member 4 flow along the slits 44, so that the electromagnetic forces exerted by fluxes have a definite direction, so that these forces can be converted to a torque efficiently. The drive member 4 is useful insofar as the portion thereof to be opposed to the poles 22, 32 is at least made of a nonmagnetic conductive material. For example, the widthwise opposite edge portions 41, 41 can be made of a conductive material such as iron.

What is claimed is:

1. An electromagnetic induction driving method comprising the steps of:
    disposing an outer magnetic member and an inner magnetic member opposingly adjacent one another, at least one of the outer magnetic member and the inner magnetic member forming at least three magnetic poles opposing the other magnetic members, thereby forming at least a closed magnetic circuit having at least three gaps defined by the outer magnetic member and the inner magnetic member opposed thereto;
    disposing in each of the poles a single drive member made of an electrically conductive material, which is wider than the width of each of the gaps, said single drive member being provided at each of its opposite sides with edge portions not opposing the gaps;
    producing in each of said gaps a magnetic flux, the phases of each of the magnetic fluxes being different from one another, and the intensity of each of the magnetic fluxes varying with time;
    generating induced currents in the drive member by penetrating magnetic fluxes at each position opposing the gaps, and inducing currents circulating around said positions by way of both edge portions;
    producing electromagnetic force on the drive member by the magnetic fluxes penetrating the drive member and the circulating induced currents at the gaps on the path of circulation; and
    rotating or moving straight the drive member in one direction.

2. An electromagnetic induction driving method as defined in claim 1 wherein the inner magnetic member and the drive member are each in the form of a cylinder and joined together, and magnetic poles are formed on the outer magnetic member to rotate the inner magnetic member and the drive member.

3. An electromagnetic induction driving method as defined in claim 1 wherein the outer magnetic member and the drive member are each in the form of a cylinder and joined together, and magnetic poles are formed on the inner magnetic member to rotate the outer magnetic member and the drive member.

4. An electromagnetic induction driving method as defined in claim 1 wherein the drive member is in the form of a cylinder, and magnetic poles are formed on the outer and inner magnetic members and opposed respectively to the outer side and the inner side of the drive member to rotate the drive member.

5. An electromagnetic induction driving method as defined in claim 1 wherein at least one of the outer and inner magnetic members is provided with at least three magnetic poles, at least one of the poles being provided with a coil for use in common for forward and reverse driving, the other poles being provided with a forward driving coil and a reverse driving coil respectively, the forward and reverse driving coil being electrically connected in series with an a.c. power source to constitute a first closed electric circuit, the forward driving coil and the reverse driving coil being alternatively connectable electrically in series with an electric element comprising a capacitor, resistor or the combination thereof to constitute second and third closed electric circuits, whereby at least three forward or reverse phase differences are produced between magnetic fluxes penetrating the drive member.

6. An electromagnetic induction driving method as defined in claim 1 wherein at least one of the outer and inner magnetic members is provided with at least three magnetic poles, at least one of the poles being provided with a coil electrically connected in series with an a.c. power source to constitute a first closed electric circuit, at least one of the poles being provided with a coil electrically connected in series with an electric element comprising a capacitor, resistor or the combination thereof to constitute a second closed electric circuit, whereby at least three phase differences are produced between magnetic fluxes penetrating the drive member.

7. An electromagnetic induction driving method as defined in claim 1 wherein at least one of the outer and inner magnetic members has three magnetic poles each provided with a coil, the coils being connected to three-phase a.c. power sources to produce three phase differences between magnetic fluxes penetrating the drive member.

8. An electromagnetic induction driving device comprising:
    an outer magnetic member;
    an inner magnetic member disposed opposingly adjacent to said outer magnetic member;
    at least three magnetic poles provided at least on one of the outer and inner magnetic members and opposing the other magnetic member, thereby forming at least one closed magnetic circuit having at least three gaps defined by said inner magnetic member and said outer magnetic member;
    a first coil connected with an a.c. power source provided at least at one magnetic pole the first coil producing said closed magnetic circuits passing around the magnetic pole, one of said gaps associated with said magnetic pole, the other magnetic member, the other said gaps and the other magnetic poles;

a second coil and a third coil provided on the other magnetic poles, respectively, said second and third coils connected with or without an a.c. power source, said coils being connectable by a switch with a capacitor or a resistor or an electrical element comprising a capacitor and resistor, said coils being electrically connectable by a switch, and producing said closed magnetic circuit; and a single drive member made of an electrically conductive material, disposed in each of the poles between the magnetic poles and the other magnetic member, the drive member being wider than each of the gaps and provided at each of its opposite sides with edge portions not opposed to the gaps.

9. An electromagnetic induction driving device as defined in claim 8 wherein the inner magnetic member and the drive member are each in the form of a cylinder and joined together, and the magnetic poles are formed on the outer magnetic member to rotate the inner magnetic member and the drive member.

10. An electromagnetic induction driving device as defined in claim 8 wherein the outer magnetic member and the drive member are each in the form of a cylinder and joined together, and the magnetic poles are formed on the inner magnetic member to rotate the outer magnetic member and the drive member.

11. An electromagnetic induction driving device as defined in claim 8 wherein the edge portions at the opposite sides of the drive member are separated therefrom and are each electrically connected at opposite ends thereof to an electric circuit, a central drive portion of the member being slidable relative to the edge portions, whereby the drive member is rotated or moved straight.

12. An electromagnetic induction driving device as defined in claim 8 wherein the drive member is formed with slits in a direction orthogonal to the direction of movement thereof.

13. An electromagnetic induction driving device as defined in claim 8 wherein the poles are smaller than the drive member in width and are arranged centrally of the drive member, and the drive member is supported rotatably or movably straight and is uniform in wall thickness and width.

14. An electromagnetic induction driving device comprising:

an outer magnetic member;

an inner magnetic member disposed opposingly adjacent to said outer magnetic member;

at least three magnetic poles provided at least on one of the outer and inner magnetic members and opposing the other magnetic member, thereby forming at least one closed magnetic circuit having at least three gaps defined by said inner magnetic member and said outer magnetic member;

a first coil connected with an a.c. power source provided at least at one magnetic pole, the first coil producing said closed magnetic circuits passing around the magnetic pole, one of said gaps associated with said magnetic pole, the other magnetic member, the other said gaps and the other magnetic poles;

a second coil connected with a capacitor or a resistor or an electrical element comprising a capacitor and resistor provided on another magnetic pole, and the producing said closed magnetic circuit; and a single drive member constructed of an electrically conductive material, disposed in each of the poles between the magnetic poles and the other magnetic member, the drive member being wider than each of the gaps and provided at each of its opposite sides with edge portions not opposed to the gaps.

15. An electromagnetic induction driving device as defined in claim 14 wherein the poles are smaller than the drive member In width and are arranged centrally of the drive member, and the drive member is supported rotatably or movably straight and is uniform in wall thickness and width.

16. An electromagnetic induction driving device as defined in claim 14 wherein the inner magnetic member and the drive member are each in the form of a cylinder and joined together, and the magnetic poles are formed on the outer magnetic member to rotate the inner magnetic member and the drive member.

17. An electromagnetic induction driving device as defined in claim 14 wherein the outer magnetic member and the drive member are each in the form of a cylinder and joined together, and the magnetic poles are formed on the inner magnetic member to rotate the outer magnetic member and the drive member.

18. An electromagnetic induction driving device as defined in claim 14 wherein the edge portions at the opposite sides of the drive member are separated therefrom and are each electrically connected at opposite ends thereof to an electric circuit, a central drive portion of the member being slidable relative to the edge portions, whereby the drive member is rotated or moved straight.

19. An electromagnetic induction driving device as defined in claim 14 wherein the drive member is formed with slits in a direction orthogonal to the direction of movement thereof.

* * * * *